(12) United States Patent
Baduge

(10) Patent No.: US 10,699,101 B2
(45) Date of Patent: Jun. 30, 2020

(54) SYSTEM AND METHOD FOR DETECTING A PERSON INTERESTED IN A TARGET

(71) Applicant: PANASONIC INTELLECTUAL PROPERTY MANAGEMENT CO., LTD., Osaka (JP)

(72) Inventor: Thilmee Malinda Baduge, Paramus, NJ (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 147 days.

(21) Appl. No.: 15/763,768

(22) PCT Filed: Sep. 29, 2016

(86) PCT No.: PCT/US2016/054421
§ 371 (c)(1),
(2) Date: Mar. 27, 2018

(87) PCT Pub. No.: WO2017/059058
PCT Pub. Date: Apr. 6, 2017

(65) Prior Publication Data
US 2019/0050630 A1 Feb. 14, 2019

Related U.S. Application Data

(60) Provisional application No. 62/234,331, filed on Sep. 29, 2015.

(51) Int. Cl.
*G06K 9/00* (2006.01)
*G06T 7/70* (2017.01)

(52) U.S. Cl.
CPC ..... *G06K 9/00268* (2013.01); *G06K 9/00597* (2013.01); *G06K 9/00771* (2013.01);
(Continued)

(58) Field of Classification Search
None
See application file for complete search history.

(56) References Cited

U.S. PATENT DOCUMENTS 9,147,121 B2    9/2015  Fujimatsu et al.
2013/0135455 A1* 5/2013  Hjelm ............... G06Q 30/0261
                                                    348/77
(Continued)

FOREIGN PATENT DOCUMENTS

WO    2011/008071    1/2011
WO    2015/072604    5/2015

OTHER PUBLICATIONS

International Search Report (ISR) from International Searching Authority (US) in International Pat. Appl. No. PCT/US2016/054421, dated Feb. 17, 2017.
(Continued)

*Primary Examiner* — Leon Viet Q Nguyen
(74) *Attorney, Agent, or Firm* — Greenblum & Bernstein, P.L.C.

(57) ABSTRACT

A system for detecting a person being interested in a target includes a camera configured to capture an image of a location in front of a target area, a memory configured to store instructions and position information with respect to the target area, and a processor that executes the instructions to perform operations including receiving the image from the camera, detecting a face of person within the image, detecting a face direction in accordance with the detected face, and determining whether the person looks at the target area in accordance with the detected face direction and the stored position information with respect to the target area.

16 Claims, 37 Drawing Sheets

(52) U.S. Cl.
CPC ...... *G06T 7/70* (2017.01); *G06T 2207/30201* (2013.01); *G06T 2207/30232* (2013.01)

(56) References Cited

U.S. PATENT DOCUMENTS

| | | |
|---|---|---|
| 2013/0136304 A1* | 5/2013 | Anabuki ............ G06K 9/00362 382/103 |
| 2014/0222501 A1 | 8/2014 | Hirakawa et al. |
| 2014/0285418 A1 | 9/2014 | Adachi |
| 2015/0131872 A1 | 5/2015 | Ganong et al. |
| 2016/0291691 A1 | 10/2016 | Lee |
| 2017/0316274 A1 | 11/2017 | Noridomi et al. |

OTHER PUBLICATIONS

International Preliminary Report on Patentability (IPRP) and Written Opinion (WO) from International Searching Authority (US) in International Pat. Appl. No. PCT/US2016/054421, dated Feb. 17, 2017.

* cited by examiner

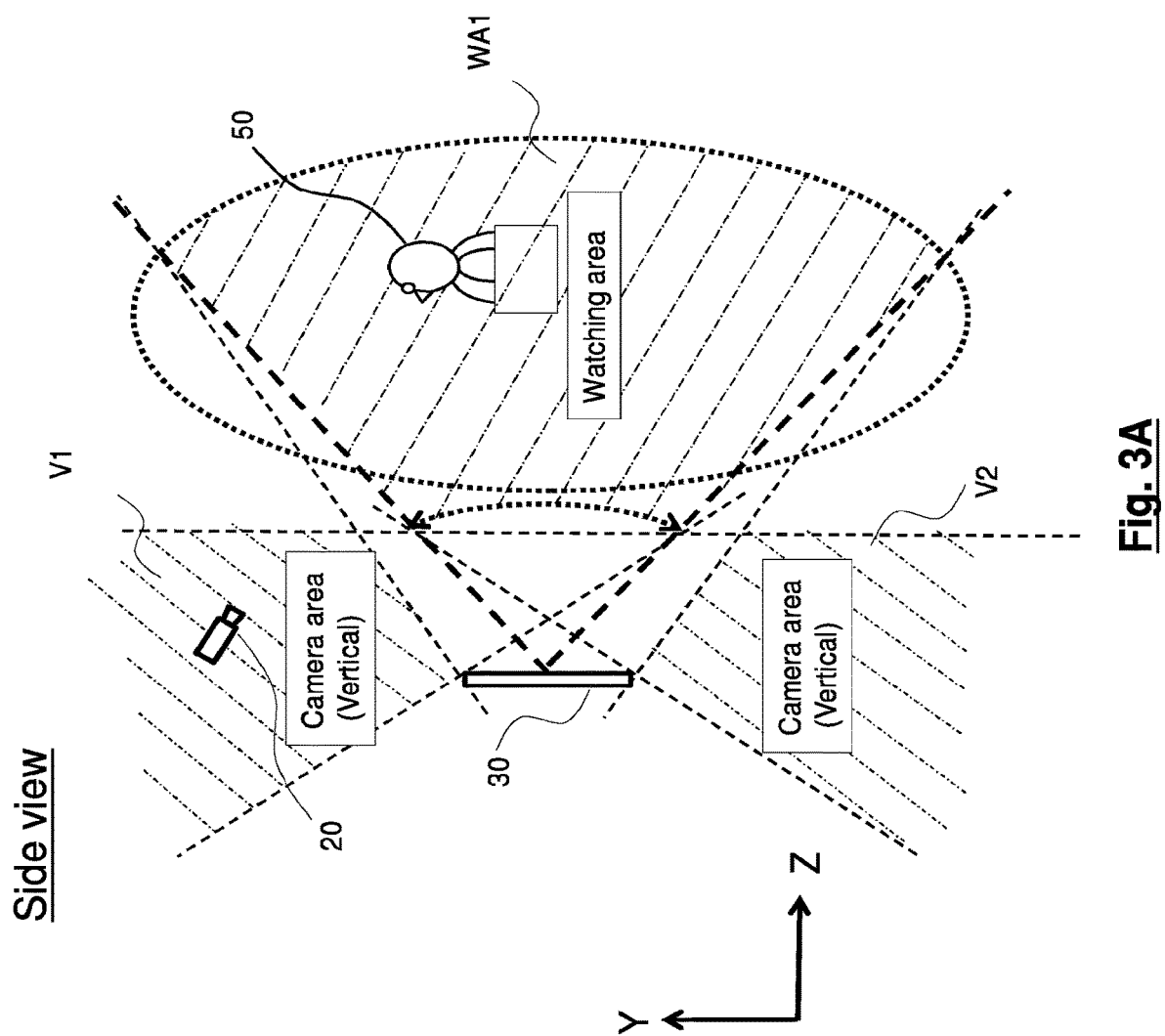

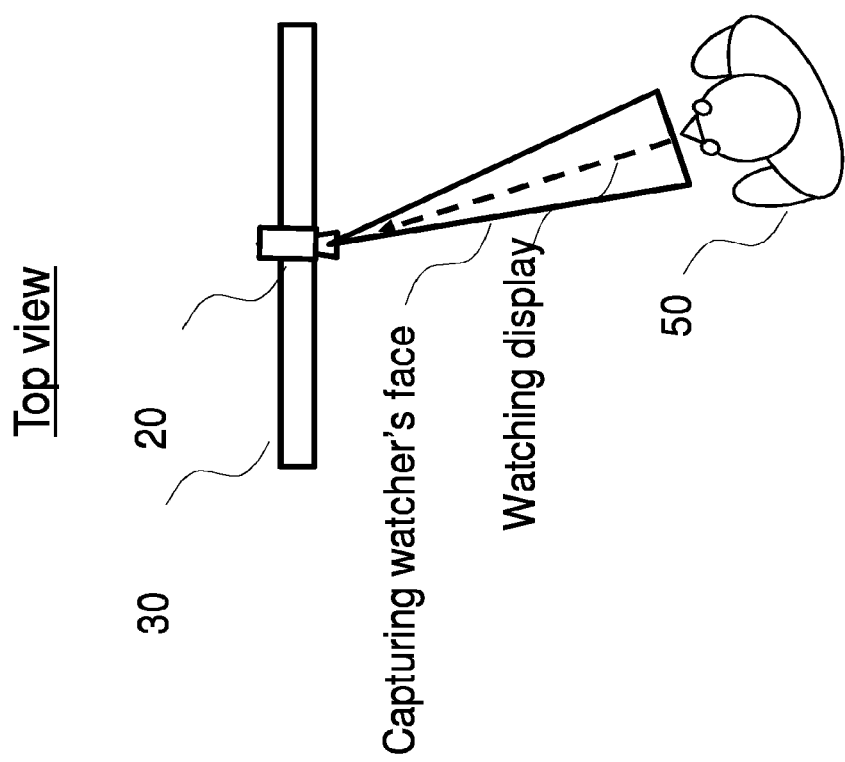

Data for, fh ≤ 40

| Horizontal data | |
|---|---|
| Coordinate ranges | Angles |
| 0-120 | -20 |
| 121-240 | -15 |
| 241-360 | -10 |
| 361-480 | -7 |
| 481-600 | -3 |
| 601-720 | 3 |
| 720-840 | 7 |
| 841-960 | 10 |
| 961-1080 | 15 |
| 1081-1200 | 20 |
| 1201-1280 | 25 |

| Vertical data | |
|---|---|
| Coordinate ranges | Angles |
| 0-120 | -3 |
| 121-240 | -7 |
| 241-360 | -10 |
| 361-480 | -15 |
| 481-600 | -20 |
| 601-720 | -25 |

Data for, 41 ≤ fh ≤ 80

| Horizontal data | |
|---|---|
| Coordinate ranges | Angles |
| 0-120 | -25 |
| 121-240 | -20 |
| 241-360 | -15 |
| 361-480 | -10 |
| 481-600 | -5 |
| 601-720 | 5 |
| 720-840 | 10 |
| 841-960 | 15 |
| 961-1080 | 20 |
| 1081-1200 | 25 |
| 1201-1280 | 30 |

| Vertical data | |
|---|---|
| Coordinate ranges | Angles |
| 0-120 | -5 |
| 121-240 | -10 |
| 241-360 | -15 |
| 361-480 | -20 |
| 481-600 | -25 |
| 601-720 | -30 |

Data for, 81 ≤ fh

| Horizontal data | |
|---|---|
| Coordinate ranges | Angles |
| 0-120 | -30 |
| 121-240 | -25 |
| 241-360 | -20 |
| 361-480 | -15 |
| 481-600 | -10 |
| 601-720 | 10 |
| 720-840 | 15 |
| 841-960 | 20 |
| 961-1080 | 25 |
| 1081-1200 | 30 |
| 1201-1280 | 35 |

| Vertical data | |
|---|---|
| Coordinate ranges | Angles |
| 0-120 | -10 |
| 121-240 | -15 |
| 241-360 | -20 |
| 361-480 | -25 |
| 481-600 | -30 |
| 601-720 | -35 |

Fig. 14B

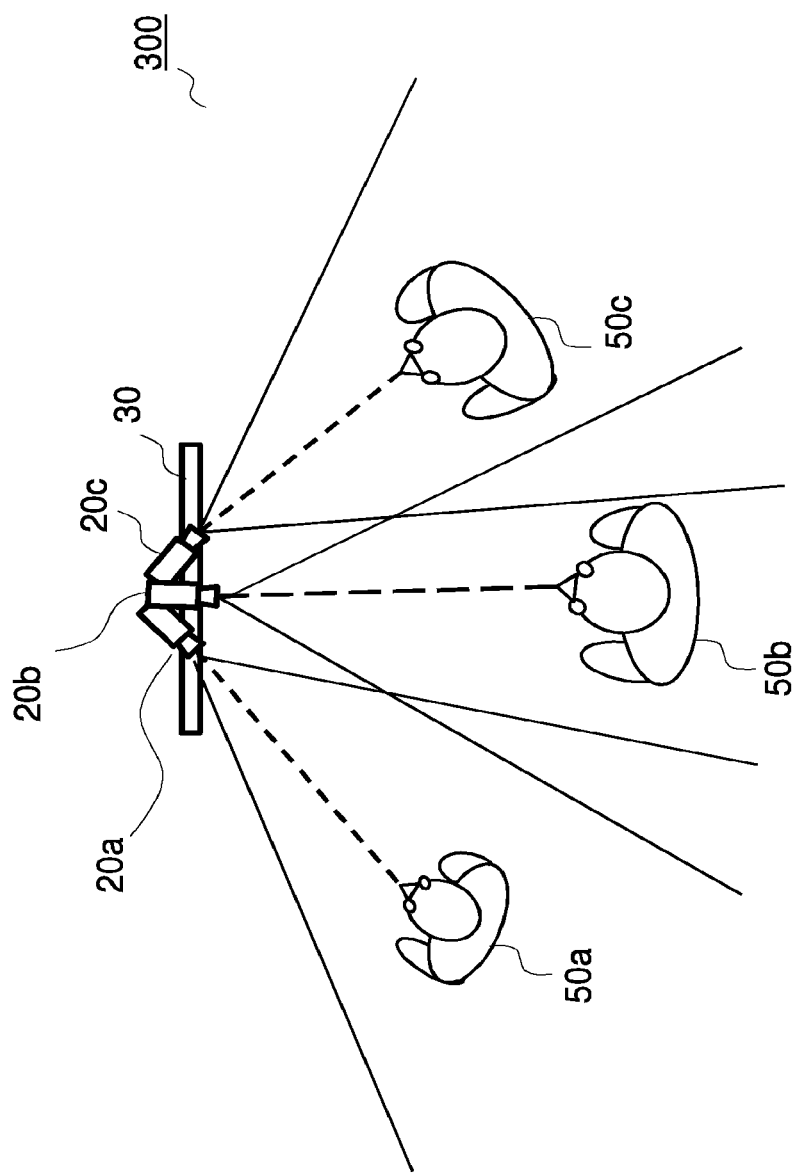

Search Conditions:
Where: ☒ area AE ☐ area AM ☒ area AS
When: ☒ 30M ☐ 1H ☐ 3H ☐ Today
Interest: ☐ A ☐ B ☐ C ☒ all
Gender: ☐ male ☐ female ☒ both
Age: ☐ 20s ☐ 30s ☐ 40s ☐ 50s ☐ 60- ☒ all

Results:

| face | Where | when | interest | Gender | age |
|---|---|---|---|---|---|
| 🙂 | AE AS | 5 min Ago | Content A | male | 27 |
| 🙂 | AE AS | 12 min ago | Content B Content C | female | 22 |
| 🙂 | AE AM AS | 23 min Ago | Content A Content C | female | 25 |
| 🙂 | AE AS | 29 min Ago | Content C | female | 52 |

Fig. 18

| No. | face | watch? | day | start time | end time | duration | content | area | start time | end time | duration | interest | face detected? | day | start time | end time | duration | age | gender |
|---|---|---|---|---|---|---|---|---|---|---|---|---|---|---|---|---|---|---|---|
| 1 | (face) | Yes | 21-Sep-16 | 11:09:45 AM | 11:09:50 AM | 0:00:05 | video A | AE | 0:00:02 | 0:00:07 | 0:00:05 | lip stick | Yes | 21-Sep-16 | 11:09:42 AM | 11:09:53 AM | 0:00:11 | 22 | female |
| 2 | | No | 21-Sep-16 | N/A | N/A | N/A | N/A | N/A | N/A | N/A | N/A | N/A | No | 21-Sep-16 | N/A | N/A | N/A | N/A | N/A |
| 3 | (face) | No | 21-Sep-16 | N/A | N/A | N/A | N/A | N/A | N/A | N/A | N/A | N/A | Yes | 21-Sep-16 | 11:30:59 AM | 11:31:23 AM | 0:00:24 | 43 | male |
| 4 | (face) | Yes | 21-Sep-16 | 11:42:03 AM | 11:42:11 AM | 0:00:08 | video B | AS | 0:00:04 | 0:00:12 | 0:00:08 | foundation | Yes | 21-Sep-16 | 11:43:02 AM | 11:45:33 AM | 0:02:31 | 20 | female |
| 5 | (face) | Yes | 21-Sep-16 | 11:44:25 AM | 11:44:46 AM | 0:00:21 | video B | AS | 0:02:26 | 0:02:47 | 0:00:21 | eye shadow | Yes | 21-Sep-16 | 11:43:02 AM | 11:45:33 AM | 0:02:31 | 20 | female |

Fig. 25

SYSTEM AND METHOD FOR DETECTING A PERSON INTERESTED IN A TARGET

CROSS-REFERENCE TO RELATED APPLICATION

This application claims the benefit of U.S. Provisional Patent Application No. 62/234,331, filed on Sep. 29, 2015, the disclosure of which is incorporated by reference herein in its entirety.

BACKGROUND OF THE INVENTION

1. Field of the Invention

The present disclosure relates to a method and a system detecting a person that is interested in a certain target by using at least one camera.

2. Description of Related Art

For a sales person or a manager of company, it is required to know what their customers want and are interested in for appealing them properly. However, in view of costs and credibility, it is not easy to collect huge data with respect to their interests in order to know accurately what they really want and create their marketing strategy based on anticipated future markets. For instance, even if a company conducts major questionnaires to many people, nobody knows until when results of the questionnaires can be used because their interests would be changed from year to year, from month to month or from day to day. In addition, such questionnaires might not be able to obtain latent interests of customers because they might be defensive to answer the questionnaires. Furthermore, interests of customers would be also changed based on where they live, season or weather and so on. Therefore, the company is required to keep catching up with their customers to do nice recommendations for them and make nice merchandise meeting their interests.

SUMMARY OF THE DISCLOSURE

In view of the above, once a camera system described herein is installed at a certain location, easily interests of customers visiting the location can be collected for short time and the customers could easily reach what they want. The camera system includes a camera that pictures an image of a location in front of a target area; a memory that stores instructions and a position information with respect to the target area; and a processor that executes the instructions to perform operations including: receiving the image from the camera; detecting a face of person within the image; detecting a face direction in accordance with the detected face; and determining whether the person looks at the target area in accordance with the detected face direction and the stored position information with respect to the target area.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein:

FIG. 3A is a side view of a system in accordance with a feature of the disclosure.

FIG. 6B is a top view of a system in accordance with a feature of the disclosure.

FIG. 14B is an example of predetermined (reference data) in accordance with a feature of the disclosure.

FIG. 15B is a top view of a system in accordance with a feature of the disclosure.

FIG. 18 is an example of terminal device in accordance with a feature of the disclosure.

FIG. 25 is an example of data source for statistical data in accordance with a feature of the disclosure.

DETAILED DESCRIPTION OF THE DISCLOSURE

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

(1) Method or System

Figure 1:
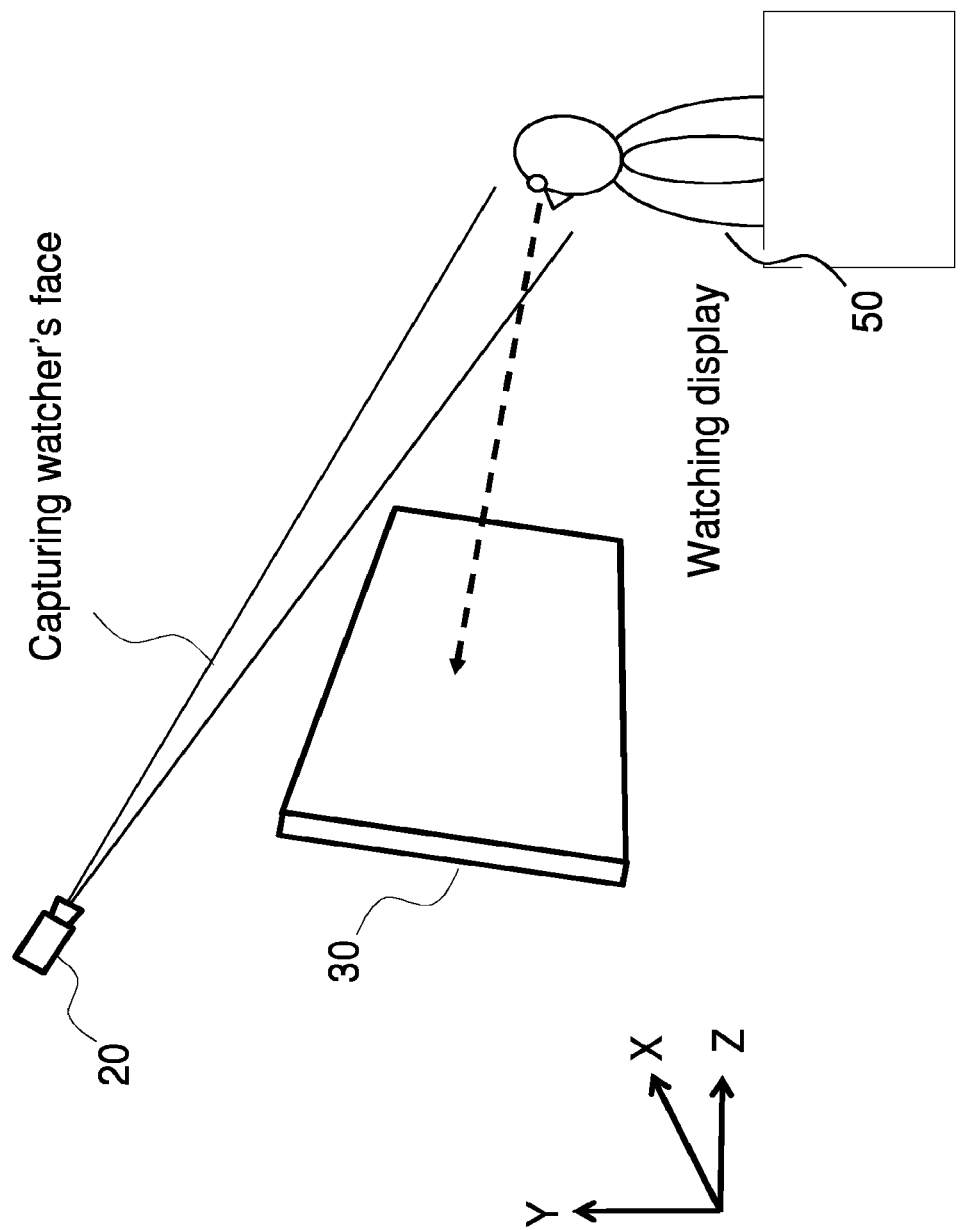
FIG. 1 is an illustration of a system in accordance with a feature of the disclosure.

FIG. 1 is an illustration of a system in accordance with a non-limiting feature of the disclosure. The system 100 for detecting a person that is interested in a certain target by using at least one camera may include at least one display 30 (e.g., digital signage) as a target area and a camera 20 positioned around the display 20. The display 30 displays something (e.g., an advertisement, information on merchandise, or information on TV shows). The camera 20 has an imaging element (including but not limited to as a CCD image sensor or CMOS image sensor) configured to capture an image. The camera 20 may additionally or alternatively include, e.g., a temperature sensor, a heat sensor, a thermal sensor, an infrared sensor, a night vision sensor, or any combination thereof as the imaging element to image or otherwise produce the image. The camera 20 further has a processor configured to process the image captured or produced by the imaging element to figure out a line of sight of a watcher (human) 50 which corresponds to a face direction of the watcher 50. (The camera 20 may determine the face direction of the watcher 50 by using another factor different from the line of sight. The camera 20 further has a memory configured to store information regarding to a position of the display 30. Thus, the processor determines whether the watcher 50 watches the display 30 based on the calculated line of sight and the information regarding a position of the display 30 or relative position information of a face of the watcher 50, the camera 20 and the target area.

Figure 2:
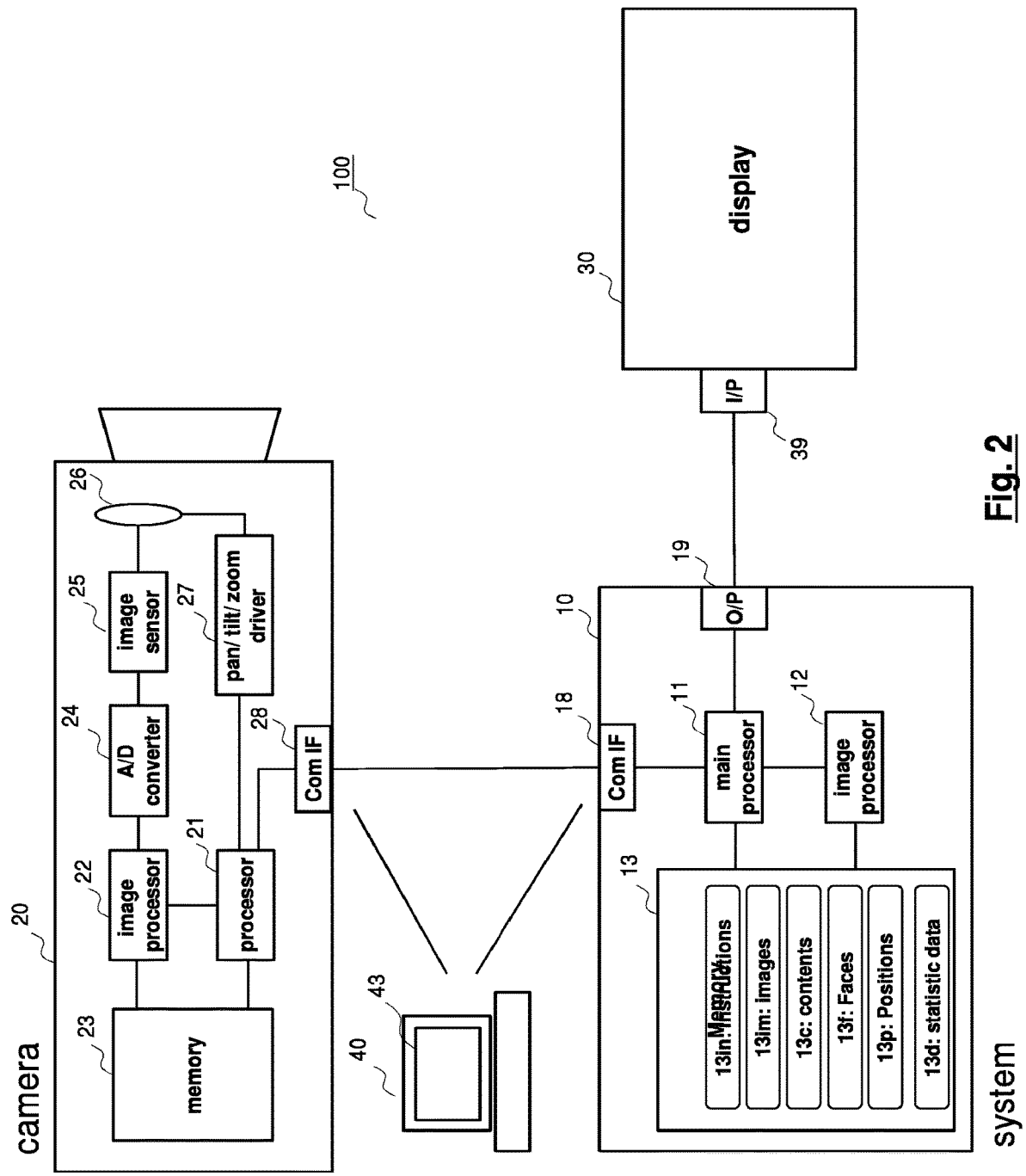
FIG. 2 is a block diagram of a system in accordance with a feature of the disclosure.

The processor and the memory may not be installed in the camera 20, in other words, the processor and the memory may be installed in another apparatus connected to the camera 20 through a communication line or network (wired or wireless). In this manner the processor processes the image (or picture) captured by the camera 20 and received from the camera 20 through the communication line or the network. Alternatively, the camera 20 processes the image (or picture) stored in the memory and imaged by the camera 20. In FIG. 2, the above-mentioned processor and memory are placed in another apparatus named a controlling system 10. FIG. 2 is a block diagram of a system 100 in accordance with a non-limiting feature of the disclosure. FIG. 2 shows one of examples of configuration of the system 100.

In this example, the system 100 includes the controlling system 10. The system 100 may further include a camera 20, a display 30 as the target area. The system 100 may further include a computer 40 as an input device and a display device for several data. Although the controlling system 10 may be an independent apparatus as shown in FIG. 2, the controlling system 10 may be consolidated into other devices (e.g. the camera 20, the display 30 or the computer 40). Alternatively, a portion of the functions of the controlling system 10 may be consolidated into other devices. Any two of all devices (i.e. the controlling system 10, the camera 20, the display 30 and the computer 40) in the system 100 may be connected via a network (e.g. a wired network, a wireless network or a combination thereof).

The camera 20 captures images (e.g., video) to monitor people or other targets walking in front of the display 30 and transmits the captured images to the controlling system 10. The camera 20 includes a processor 21, an image processor 22, a memory 23, an A/D converter 24, an image sensor 25, a lens 26, a driver 27 and a communication IF (Interface) 28. The image sensor 25 converts light collected by the lens 26 into an electronic image. In other words, the image sensor 25 generates an image based on incident light into the image sensor 25 via the lens 26. Then A/D converter 24 further converts the electronic image into digital image data. The image processor 22 performs image processing on the digital image data for storing in a memory or transmitting it to another device (e.g. the controlling system 10). Although the processed image may be stored in the memory 23, it is transferred, by the processor 21, to the controlling system 10 via the communication IF 28. The processor 21 is configured to be a main controller for the camera 20, thus controls each element 22-28. The processor 21 may communicate with the computer 40 via the communication IF 28. The camera 20 has pan, tilt and zoom functions which are controlled by the driver 27. The driver 27 can move the camera 20 in a pan direction or tilt direction in order to change locations captured by the camera 20 in response to instructions by the processor 21. The driver 27 further controls mechanical zoo-in and zoom-out of the lens 26. The driver 27 may receive instruction for moving the camera 20 or zooming the lens from user input via the computer 40.

The controlling system 10 receives the pictured images from the camera 20, and then conducts an image processing for them to find people (face). In addition, the controlling system 10 determines whether or not people pictured in the received images are watching contests displayed on the display 30. Based on this determination and other information, the controlling system 10 generates statistical data for displaying on the computer 40. That is, the statistical data indicates how many people or how much rate of people are interested in the contents on the display 30. Further, the statistical data may indicate which part of or which timing of the contents captures the interest people walking there.

To conduct the above, the image controlling system 10 includes a main processor 11, an image processor 12, a memory 13 and an output 19. The main processor 11 and the image processor 12 may be merged to a single processor. The main processor 11 controls each element 12, 13, 18 and 19. The main processor 11 receives the pictured images (video) from the camera 20 and stores them in the memory 13. The image processor 12 may perform any image processing on the received images to be a proper format before storing them in the memory 13. The memory 13 may store instructions 13 to be executed by the main processor 11, captured images 13*im* transmitted from the camera 20 and stored by the main processor 11 as mentioned above, contents 13c displayed on the display 30, detected faces 13f as described further hereinafter, position information 13p of the camera 20 and statistical data 13d mentioned above. The main processor 11 selects one or some of the contents 13c (e.g., advertisements for some products) in response to a user input which may be input by a user with the computer 40 or other terminals, then output the selected one onto the display 30 via the output 19. Thereby the display 30 receives the selected content via the input 39 and displays it. Thus, the main processor 11 controls what contents are displayed on the display 30.

The memory 13 further stores images of faces 13f detected by the image processor 12. The image processor 12 performs well-known face detection processes on the received images from the camera 20 or the images 13im stored in the memory 13. When detecting a face in an image, the image processor 12 trims away edges of the image such that the detected face is not going to be deleted and stores the trimmed image (i.e. one of faces 13f) in the memory 13. In addition, the image processor 12 may perform additional image processing on the detected faces to add, into the memory 13, further information of people walking in front of the display 30. In other words, the image processor 12 may further determine people's age, gender and so on based on the additional image processing on the detected faces. After detecting the face within the image, the image processor further detects a line of sight of the detected face. Then the main processor 11 determines whether or not the detected face (of the watcher 50) watches the display 30 in accordance with the position information 13p (further described hereinafter) and the line of sight. For instance, the main processor 11 determines that the watcher 50 watches the display 30 if it is determined that the light of sight is interact with the display 30.

The computer 40 having display 43 is, for example, placed in an office of a user of the system 100, used as a user terminal device to input preset information into the controlling system 10 and operate the camera 20 and the display 30. Thus the computer 40 may input several inputs or instructions to the controlling system 10, the camera 20 and the display 30. Before starting to monitor whether people watch the display 30, position information 13p for the camera 20 and the display 30 is input via the computer 40 by a user (then, stored in the memory 13). The position information 13p may include three-dimensional coordinate (x, y, z) of the camera 20 and the display 30. In this case, the main processor 11 may calculate relative positions between the camera 20 and the display 30. The relative position 13p, for instance, include one or some of a relative position of the camera 20 to the display 30, a relative position of the display 30 to the camera 20, a relative position of the camera 20 to a predetermined base point or a relative position of the display 20 to a predetermined base point. As an example, a lens of the camera 20 is set as the base point of which three-dimensional coordinate is defined as (X1, Y1, Z1). Furthermore, an edge (e.g. one of corners) of the display 30, which is a part of boundary of the display 30, is defined as (X2, Y2, Z2). In this case, one of relative positions of the display 30 to the base point is (X2-X1, Y2-Y1, Z2-Z1) such that, the main processor 11 calculates the relative position described above. Alternatively, a user may directly input information for the relative position.

Figure 3B:
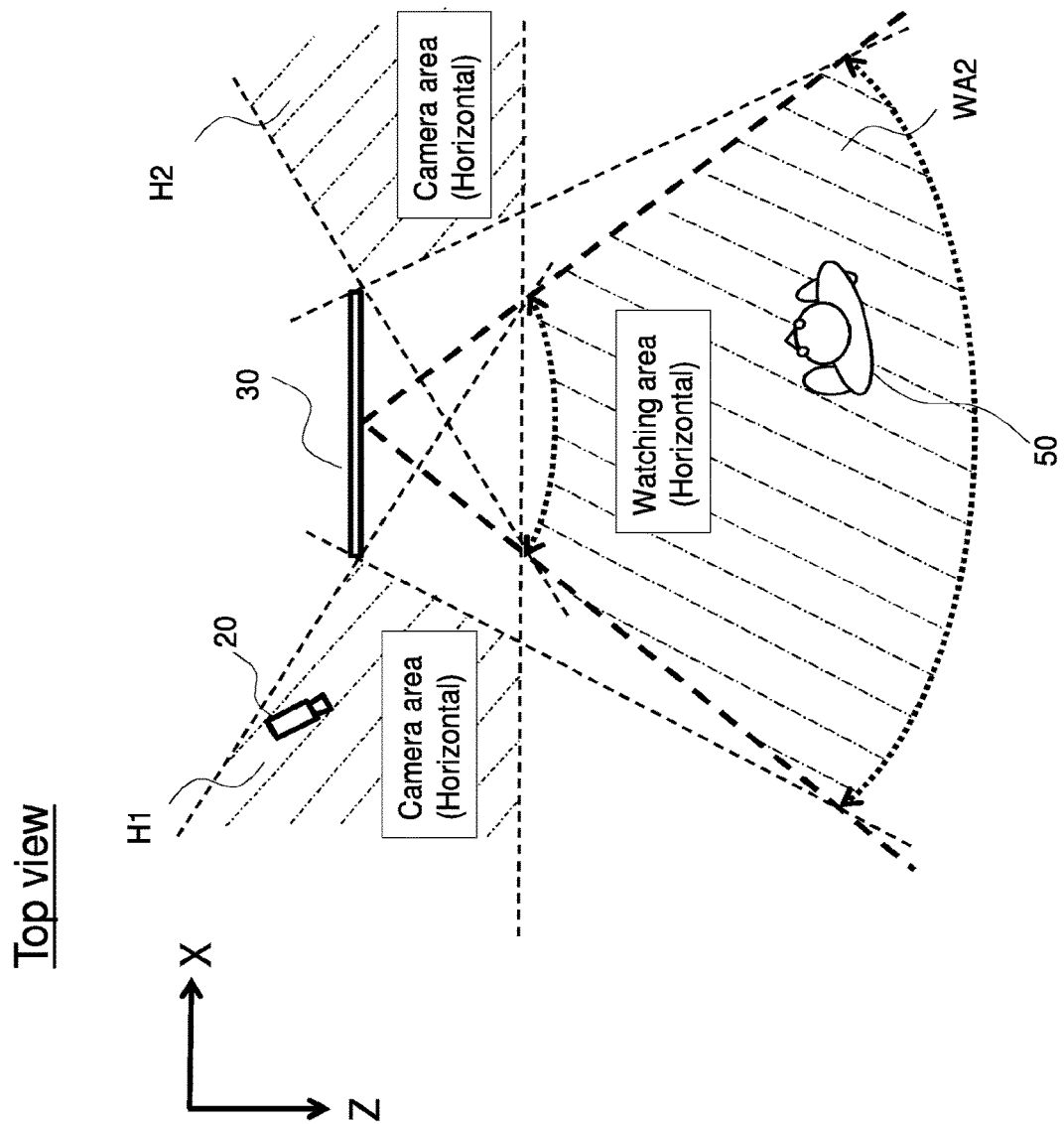
FIG. 3B is a top view of a system in accordance with a feature of the disclosure.

FIG. 3A is a side view of a system 100 (and the watcher 50) in accordance with a non-limiting feature of the disclosure. FIG. 3B is a top view of a system 100 in accordance with a feature of the disclosure. FIGS. 3A and 2B also show camera areas where the cameras are enabled to be installed or placed. In the side view, a vertical (upper) camera area V1 and a vertical (lower) camera area V2 are defined as being possible to take a picture of a vertical watching area WA1 which is defined in a predetermined distance away from the display 30 in a Z direction. The predetermined distance between the display 30 and the watching area WA1 is determined, by the main processor 11, in accordance with a location of the camera 20 and/or specifications of the display 30. The camera area V1 where the camera 20 is located is defined above the display 30 and the camera area V2 is defined under the display 30 when viewed from a side of the display 30. Similarly, in the top view, a horizontal (left) camera area H1 and a horizontal (right) camera area H2 are defined as being possible to take a picture of a horizontal watching area WA2 which is defined in a predetermined distance away from the display 30 in a Z direction. The predetermined distance between the display 30 and the watching area WA2 is determined, by the main processor 11, in accordance with a location of the camera 20 and/or specifications of the display 30. The camera area H1 where the camera 20 is located is defined in a left side of the display 30 and the camera area H2 is defined in a right side of the display 30 when viewed from a top of the display 30. The camera 20 positioned in the upper camera area V1 and in the left camera area H1 can find or recognize the watcher 50 positioned in a watching area WA1 and WA2.

In addition, the camera 20 can be installed at the lower camera area V2 instead of being placed in the upper camera area V1 (refer to FIG. 3A) Similarly, the camera 20 can be installed at the right side camera area H2 instead of being placed in the left side camera area H1 (refer to FIG. 3B). In addition, two or more cameras can be installed in deferent camera areas. In this manner, the system 100 is possible to analyze whether humans are watching or have watched the display or not with different angles because a plurality of the cameras are installed at different positions.

Figure 4A:
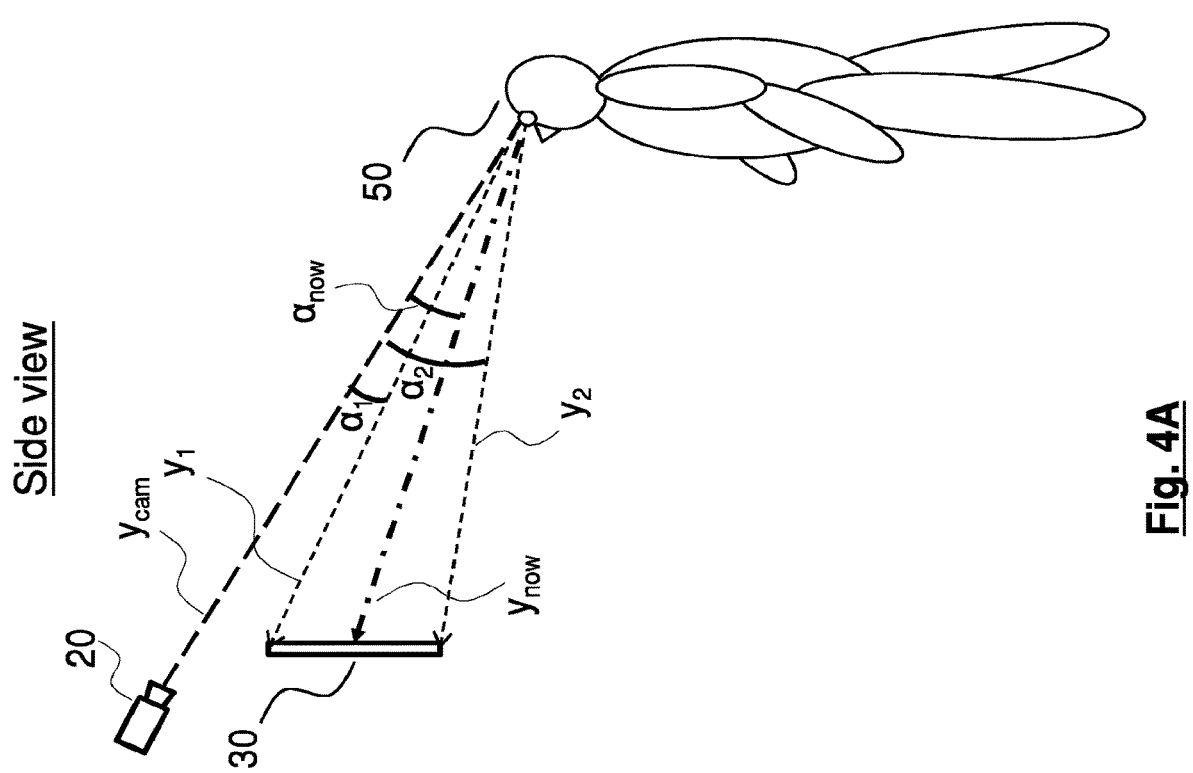
FIG. 4A is a side view of a system in accordance with a feature of the disclosure.
Figure 4B:
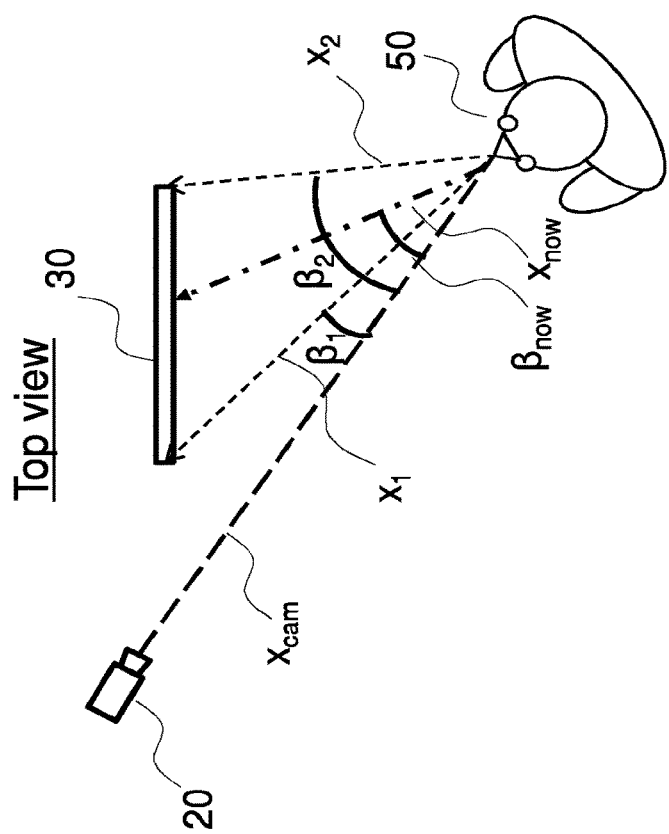
FIG. 4B is a top view of a system in accordance with a feature of the disclosure.

FIG. 4A is a side view of a system 100 in accordance with a feature of the disclosure. FIG. 4B is a top view of a system 100 in accordance with a feature of the disclosure. The processor 11 of the controlling system 10 detects the watcher 50 watching the display 30 if meeting a condition of $\alpha_1 \le \alpha_{now} \le \alpha_2$ and $\beta_1 \le \beta_{now} \le \beta_2$. Hence, if the condition is met, the main processor 11 determines that the person 50 is watching the display 30. Then the main processor 11 stores some information with respect to the watcher 50 in the memory 13, such as a picture of the face, the time when the person 50 watched, an age and/or a gender of the person 50, and the like.

The angles $\alpha_1$ and $\alpha_2$ are predetermined values and stored in the memory 13 or another memory. As an another option, the angles $\alpha_1$ and $\alpha_2$ may be calculated by the main processor 11 by using the position information 13p. The angle $\alpha_1$, as a vertical angle, is an angle between the lines $y_{now}$ and $y_1$. The line $y_{now}$ corresponds to the line of the sight of the watcher in the side view. As mentioned above. the main processor 11 calculates the line of the sight based on the image processing. The line $y_1$ corresponds to a vertical direction when the watcher 50 looks at a top edge of the display 30. The angle $\alpha_2$, as a vertical angle, is an angle between the lined $y_{now}$ and $y_2$. The line $y_2$ corresponds to a vertical direction when the watcher 50 looks at a bottom edge of the display.

The angles $\beta_1$ and $\beta_2$ are predetermined values and stored in the memory 13 or another memory. As another option, the angles $\beta_1$ and $\beta_2$ may be calculated by the main processor 11 by using the position information 13p. The angle $\beta_1$, as a horizontal angle, is an angle between the lines $x_{now}$ and $x_1$.

The line $x_{now}$ corresponds to the line of the sight of the watcher 50 in the top view. The line $x_1$ corresponds to a horizontal direction when the watcher 50 looks at a left (far) edge of the display 30. The angle $\beta_2$, as a horizontal angle, is an angle between the lines $x_{now}$ and $x_2$. The line $x_2$ corresponds to a horizontal direction when the watcher 50 looks at a right (near) edge of the display 30. Those angles and lines are also defined as below:

$y_{cam}$: watcher's vertical face direction when looking straight at the camera $y_1$: watcher's vertical face direction when looking straight at the top edge of display $y_2$: watcher's vertical face direction when looking straight at bottom edge of display $y_{now}$: watcher's vertical face direction when looking between top & bottom edge of display $\alpha_1$: angle between $y_{cam}$ and $y_1$ (predefined)

$\alpha_2$: angle between $y_{cam}$ and $y_2$ (predefined)

$\alpha_{now}$: angle between $y_{cam}$ and $y_{now}$

Figure 5A:
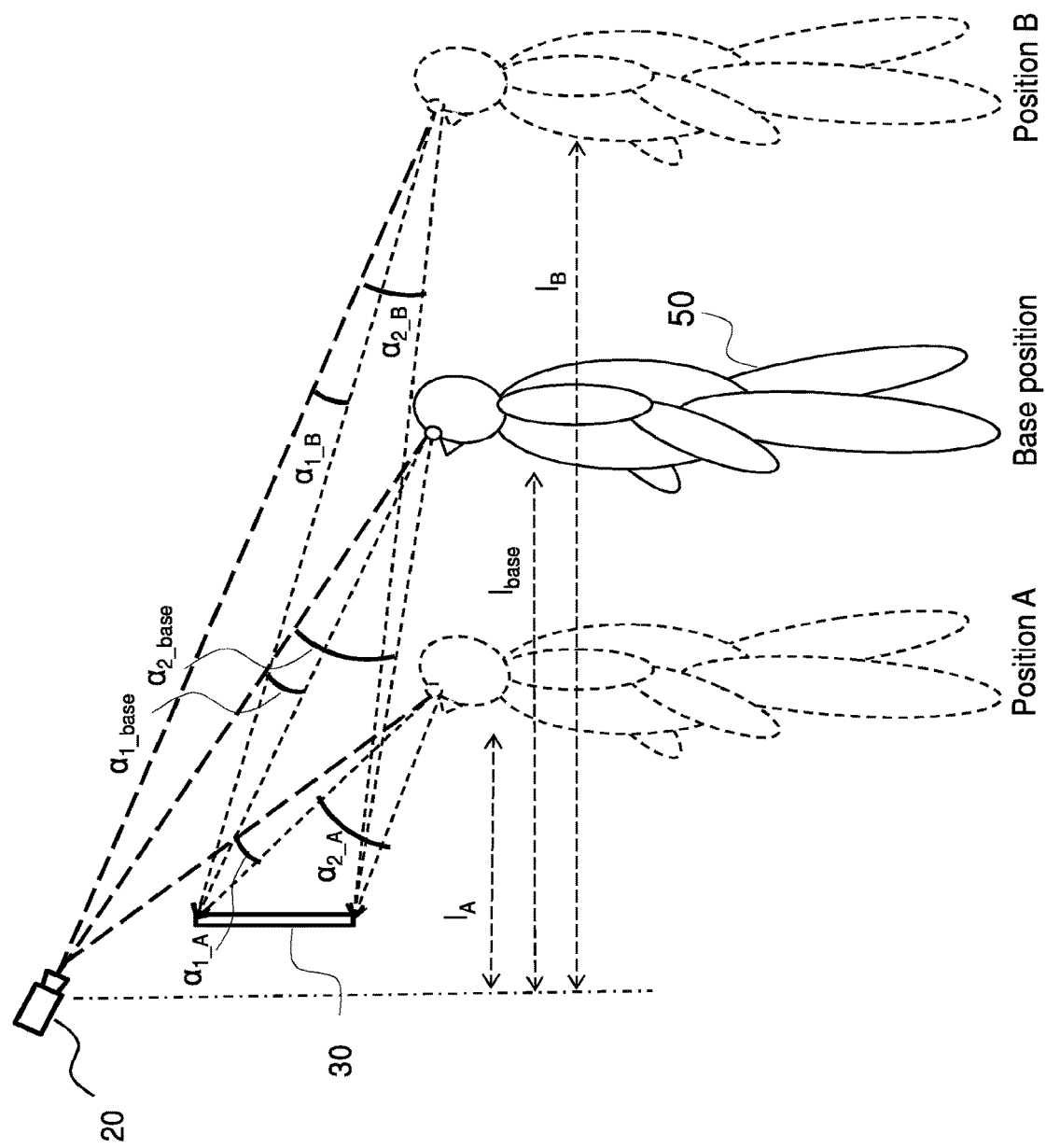
FIG. 5A is a side view of a system in accordance with a feature of the disclosure.
Figure 5B:
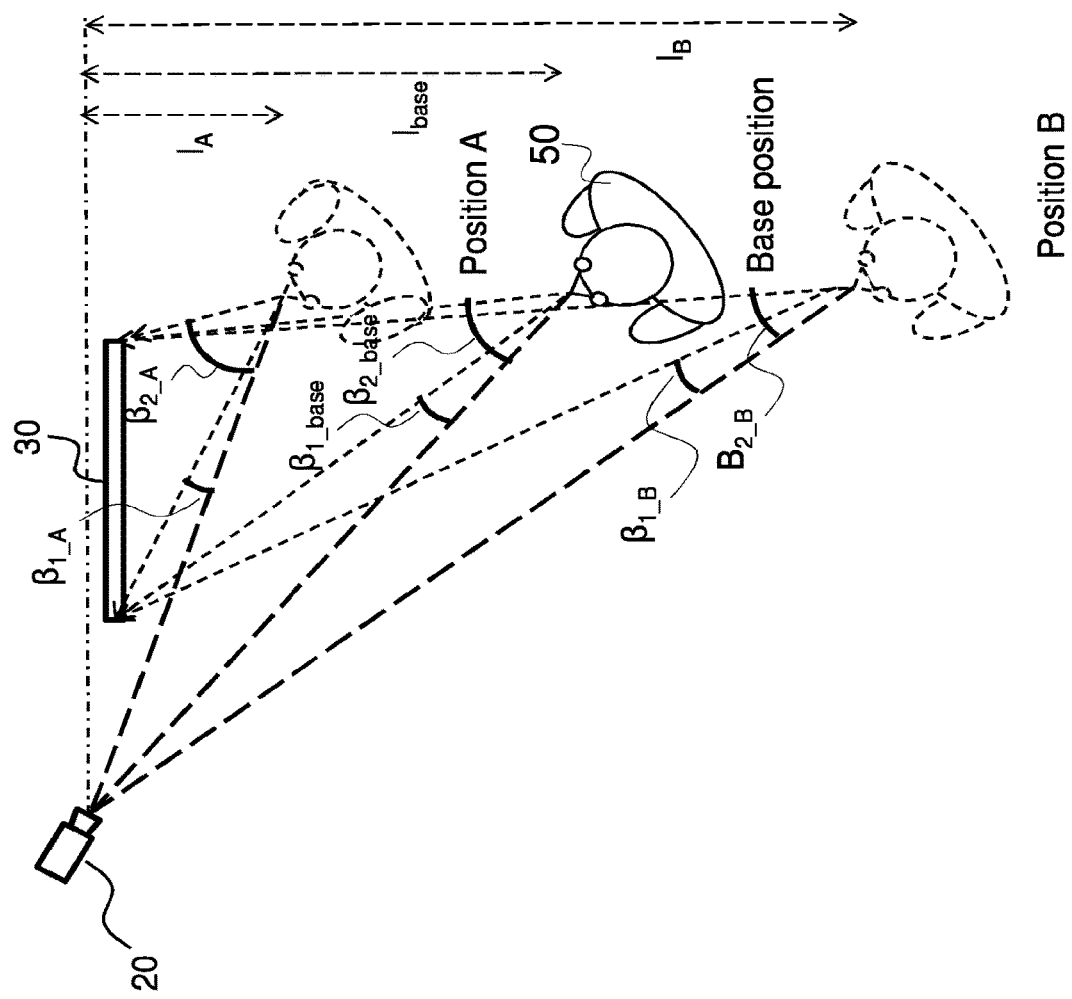
FIG. 5B is a top view of a system in accordance with a feature of the disclosure.

FIG. 5A is a side view of a system 100 in accordance with a non-limiting feature of the disclosure. FIG. 5B is a top view of a system 100 in accordance with a non-limiting feature of the disclosure. Distance (I) is defined as following:

I: horizontal distance from camera to watcher $I_{base}$: horizontal (predetermined) distance from camera to watcher where watcher's position makes the angles α1 and α2 maximum (base position).

$I_A$: horizontal (predetermined) distance from camera to watcher where watcher's position is closer than the base position and closest to display.

$I_B$: horizontal (predetermined) distance from camera to watcher where watcher's position is farer than the base position and farthest from display.

The processor 11 detects the watcher 50 watching the display if meeting a condition of $\alpha_{1\_base}-\lambda_1 \leq \alpha_{now} \leq \alpha_{2\_base}-\lambda_2$ and $\beta_{1\_base}-\lambda_1 \leq \beta_{now} \leq \beta_{2\_base}-\lambda_2$. The $\lambda_1$ and $\lambda_2$ are calculated based on vertical or horizontal distance between the camera 20 and each positioned watcher 50. Further the $\lambda_1$ and $\lambda_2$ are changed in response to a position of the watcher 50 (i.e. horizontal distance (I)). Thus, the person 50 is detected as a watcher if meeting below conditions:

$\alpha_{1\_base}-\lambda_1 \leq \alpha_{now} \leq \alpha_{2\_base}-\lambda_2$ if ($I \leq I_{base}$):

$\lambda_1 = ((\alpha_{1\_base}-\alpha_{1\_A})*(I_{base}-I)/(I_{base}-I_A)$ $\lambda_2 = ((\alpha_{2\_base}-\alpha_{2\_A})*(I_{base}-I)/(I_{base}-I_A)$ if ($I \geq I_{base}$):

$\lambda_1 = ((\alpha_{1\_base}-\alpha_{1\_B})*(I-I_{base}))/(I_B-I_{base})$ $\lambda_2 = ((\alpha_{2\_base}-\alpha_{2\_B})*(I-I_{base}))/(I_B-I_{base})$ The position of the watcher 50 is detected by the processor 11 based on the image processing by the image processor 12. Alternatively, the system 100 may have a distance sensor (not shown) to sense the horizontal distance (I).

Figure 6A:
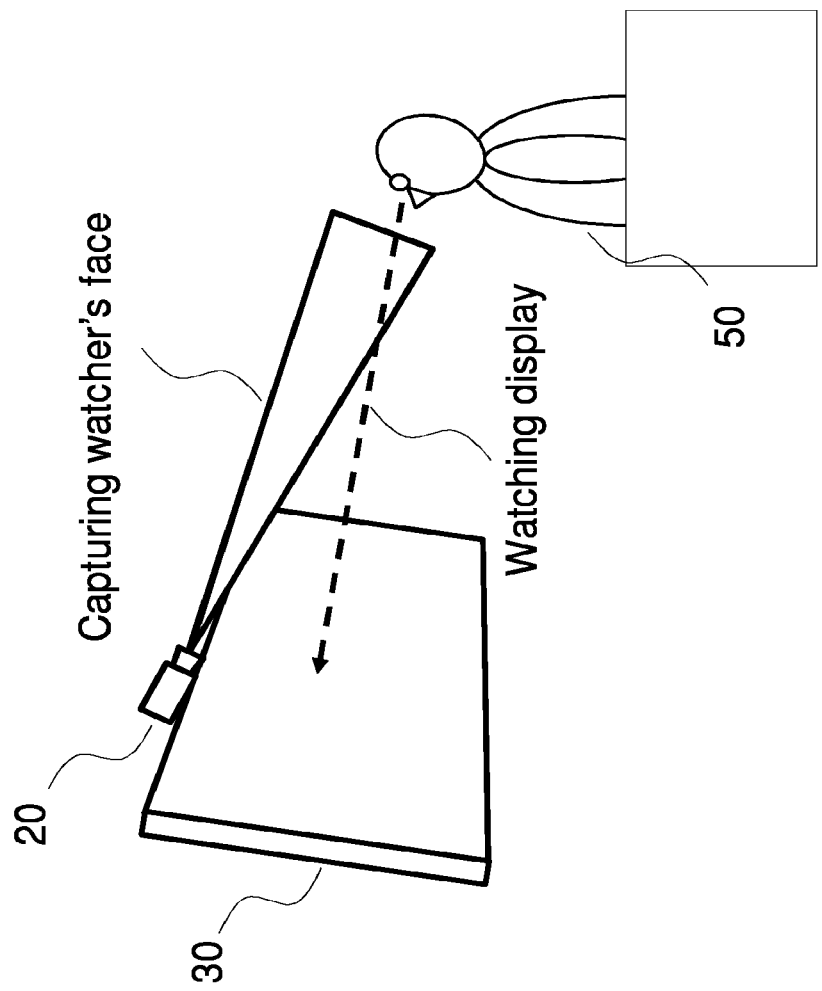
FIG. 6A is an illustration of a system in accordance with a feature of the disclosure.

FIG. 6A is a side view of a system in accordance with a feature of the disclosure. FIG. 6B is a top view of a system in accordance with a non-limiting feature of the disclosure. FIGS. 6A and 6B show an example that the camera 20 is attached on the top edge of the display. Thus the camera 20 and the upper edge of the display 30 are placed in the substantially same position.

Figure 7A:
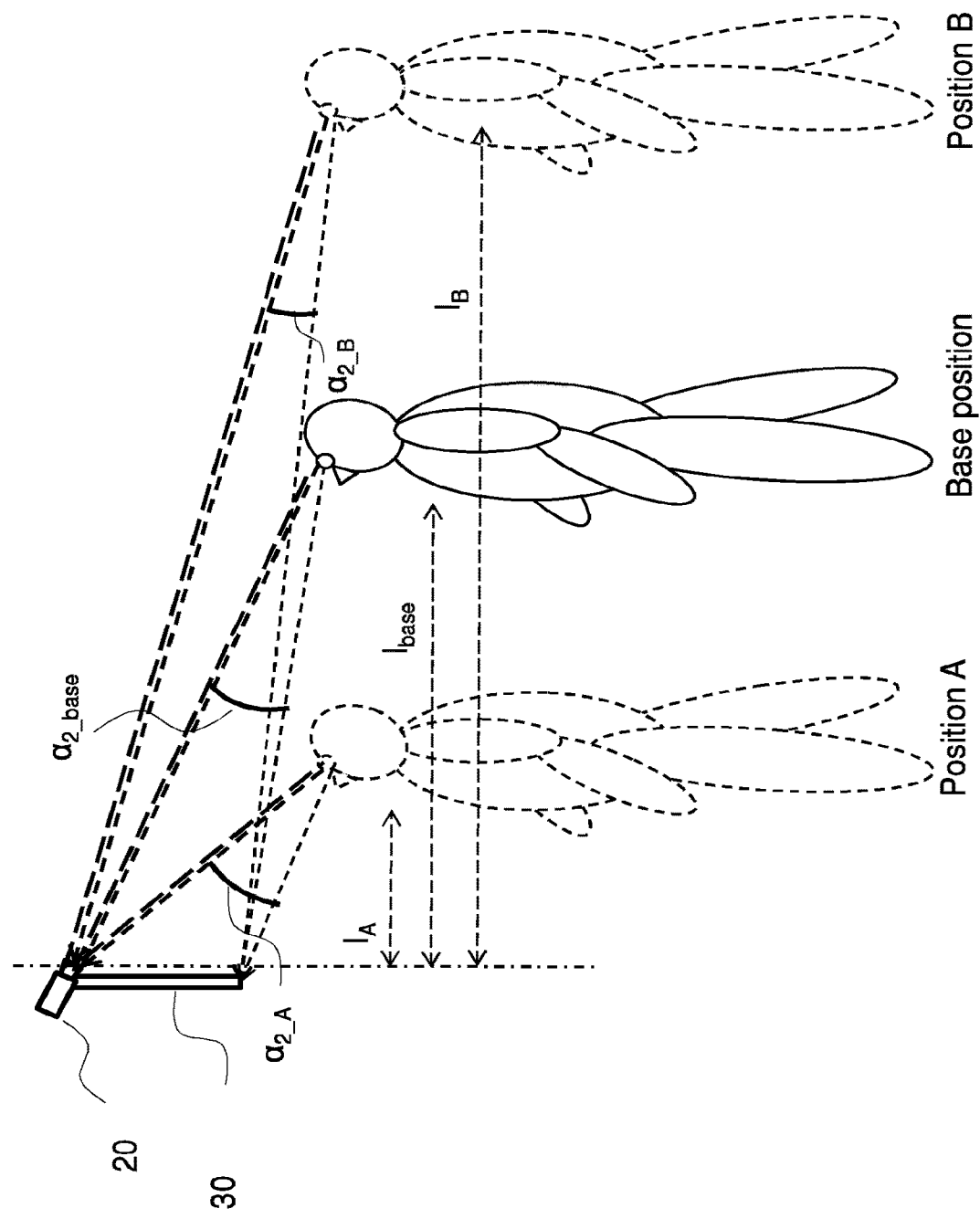
FIG. 7A is a side view of a system in accordance with a feature of the disclosure.
Figure 7B:
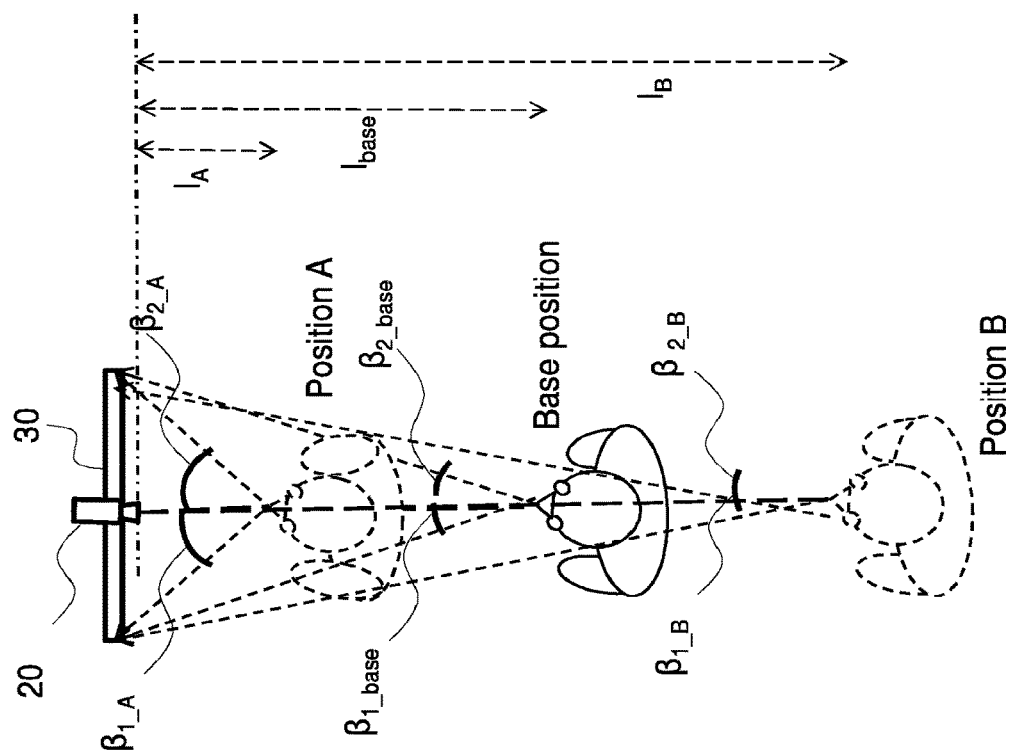
FIG. 7B is a top view of a system in accordance with a feature of the disclosure.

FIG. 7A is a side view of a system 100 in accordance with a non-limiting feature of the disclosure. FIG. 7B is a top view of a system 100 in accordance with a feature of the disclosure. In this manner, the system 100 substantially does not calculate angles $\alpha_{1\_A}$, $\alpha_{1\_base}$ and $\alpha_{1\_B}$ (different from examples shown FIGS. 4A, 4B, 5A and 5B) because each of the angles $\alpha_{1\_A}$, $\alpha_{1\_base}$ and $\alpha_{1\_B}$ is substantially zero. Accordingly the processor 11 detects the watcher 50 watching the display 30 if $\alpha_{now} \leq \alpha_{2\_base}-\lambda_2$, $\beta_{now} \leq \beta_{1\_base}-\lambda_1$, and, $\beta_{now} \leq \beta_{2\_base}-\lambda_2$. In detail, the person 50 is detected as a watcher if meeting below conditions:

$\alpha_{now} \leq \alpha_{2\_base}-\lambda_2$ if ($I \leq I_{base}$)

Figure 8A:
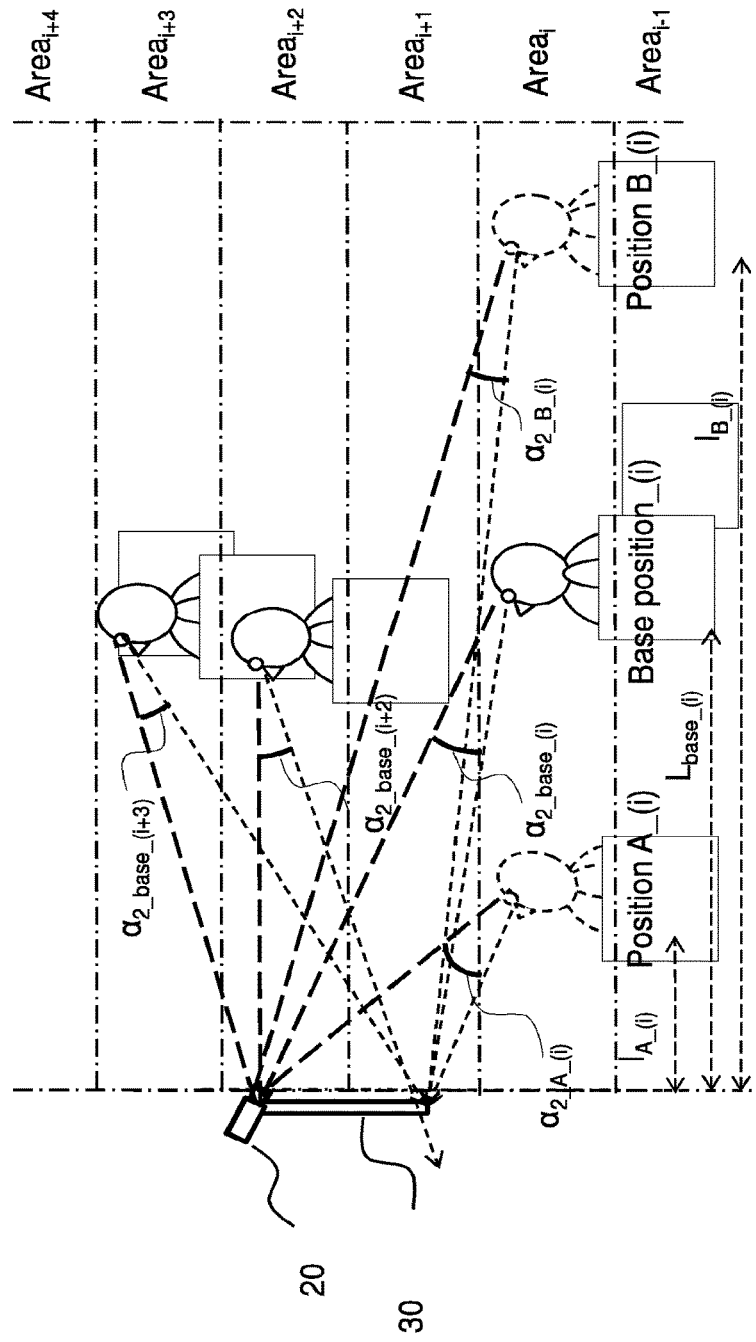
FIG. 8A is a side view of a system in accordance with a feature of the disclosure.
Figure 8B:
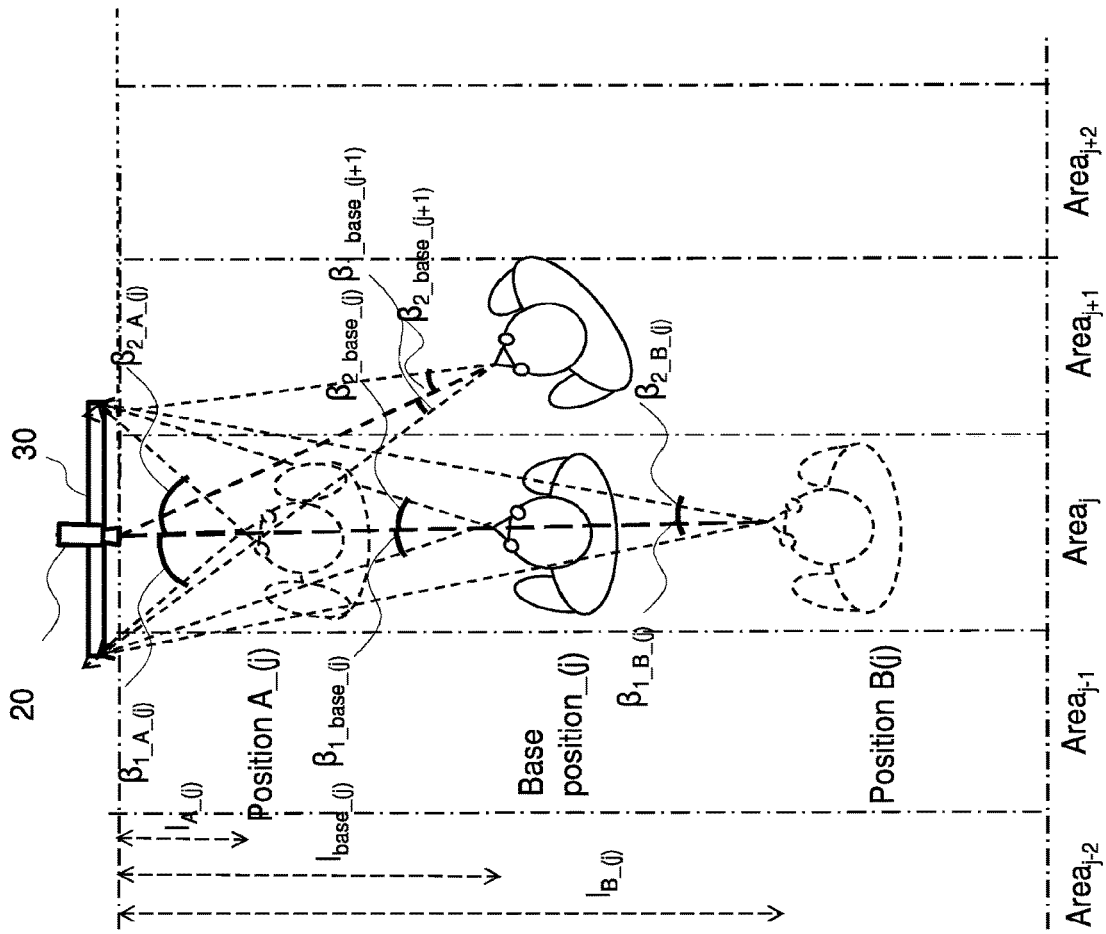
FIG. 8B is a top view of a system in accordance with a feature of the disclosure.

$\lambda_2 = ((\alpha_{2\_base}-\alpha_{2\_A})*(I_{base}-I))/(I_{base}-I_A)$ if ($I \geq I_{base}$):

$\lambda_2 = ((\alpha_{2\_base}-\alpha_{2\_base}))*(I-I_{base}))/(I_B-I_{base})$ $\beta_{now} \leq \beta_{1\_base}-\lambda_1$ $\beta_{now} \leq \beta_{2\_base}-\lambda_2$ if ($I \leq I_{base}$):

$\lambda_1 = ((\beta_{1\_base}-\beta_{1\_A})*(I_{base}-I))/(I_{base}-I_A)$ $\lambda_2 = ((\beta_{2\_base}-\beta_{2\_A})*(I_{base}-I))/(I_{base}-I_A)$ if ($I \geq I_{base}$):

$\lambda_1 = ((\beta_{1\_base}-\beta_{1\_B})*(I-I_{base}))/(I_B-I_{base})$ $\lambda_2 = ((\beta_{2\_base}-\beta_{2\_B})*(I-I_{base}))/(I_B-I_{base})$ FIG. 8A is a side view of a system 100 in accordance with a non-limiting feature of the disclosure. FIG. 8B is a top view of a system 100 in accordance with a non-limiting feature of the disclosure. In an example shown in FIGS. 8A and 7B, the system 100 further considers a height of the person 50. Hence, conditions for detecting the watcher 50 are changed based on the height of the person 50 (i.e. which area, a face of the person 50 is positioned in). The processor 11 detects the watcher 50 watching the display 30 if $\alpha_{now} \leq \alpha_{2\_base\_(i)}-\lambda_{2\_(i)}$, $\beta_{now} \leq \beta_{1\_(j)}-\lambda_{1\_(j)}$, and, $\beta_{now} \leq \beta_{2\_base\_(j)}-\lambda_{2\_(j)}$. The $\alpha_{2\_(i)}$ and $\lambda_{2\_(i)}$ are changed based on a position (i) of the watcher 50. Similarly the $\beta_{1\_base\_(i)}$, $\lambda_{1\_(j)}$, $\beta_{2\_(j)}$, and, $\lambda_{2\_(j)}$ are also changed based on a positon (j) of the watcher 50. In detail, the person 50 is detected as a watcher if meeting below conditions:

$\alpha_{now} \leq \alpha_{2\_base\_(i)}-\lambda_{2\_(i)}$ if ($I \leq I_{base\_(i)}$):

$\lambda_{2\_(i)} = ((\alpha_{2\_base\_(i)}-\alpha_{2\_A\_(i)})*(I_{base\_(i)}-I))/(I_{base\_(i)}-I_{A\_(i)})$ if ($I \geq I_{base\_(i)}$):

$\Lambda_{2\_(i)} = ((\alpha_{2\_base\_(i)}-\alpha_{2\_B\_(i)})*(I-I_{base\_(i)}))/(I_{B\_(i)}-I_{base\_(i)})$ $\beta_{now} \leq \beta_{1\_base\_(i)}-\lambda_{1\_(i)}$ (if $\beta_{now}$ is measured anti-clockwise)

Figure 9:
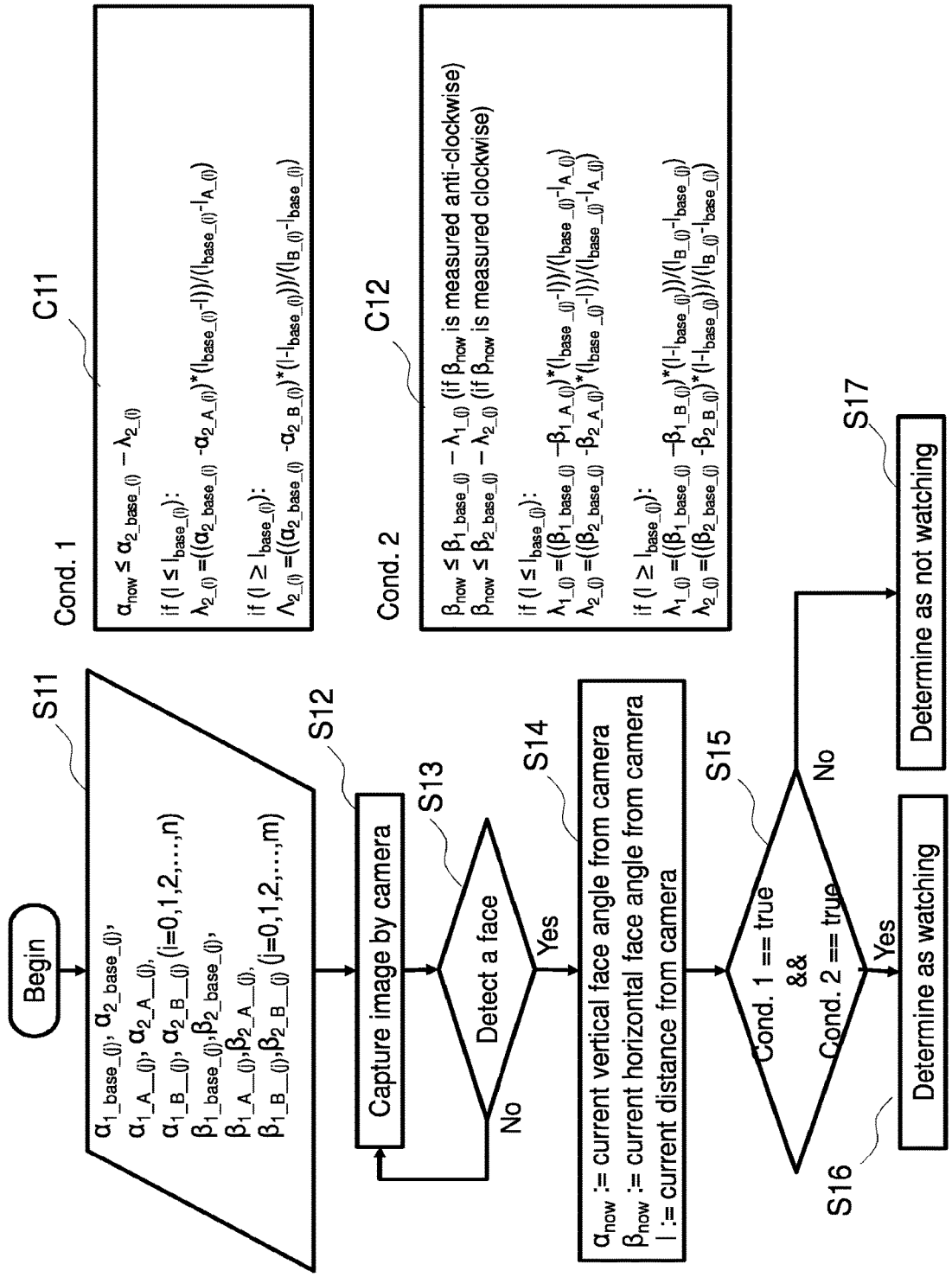
FIG. 9 is a flowchart in accordance with a feature of the disclosure.

$\beta_{now} \leq \beta_{2\_base\_(j)}-\lambda_{2\_(j)}$ (if $\beta_{now}$ is measured clockwise)

if ($I \leq I_{base\_(j)}$):

$\lambda_{1\_(j)} = ((\beta_{1\_base\_(j)}-\beta_{1\_A\_(j)})*(I_{base\_(j)}-I))/(I_{base\_(j)}-I_{A\_(j)})$ $\lambda_{2\_(j)} = ((\beta_{2\_base\_(j)}-\beta_{2\_A\_(j)})*(I_{base\_(j)}-I))/(I_{base\_(j)}-I_{A\_(j)})$ if ($I \geq I_{base\_(j)}$):

$\lambda_{1\_(j)} = ((\beta_{1\_base\_(j)}-\beta_{1\_B\_(j)})*(I-I_{base\_(j)}))/(I_{B\_(j)}-I_{base\_(j)})$ $\lambda_{2\_(j)} = ((\beta_{2\_base\_(j)}-\beta_{2\_B\_(j)})*(I-I_{base\_(j)}))/(I_{B\_(j)}-I_{base\_(j)})$ FIG. 9 is a flowchart in accordance with a non-limiting feature of the disclosure. As mentioned above, in step S11, the main processor 11 or the camera 20 calculates several angles α and β based on the position information 13p in advance. In step 12, the camera 20 captures an image. Then if the camera 20 detects a face in the image captured by the camera 20 in step S13, the main processor 11 calculates angles $\alpha_{now}$, $\beta_{now}$ and the distance I in step 14. Then, in step 15 the processor 21 determines whether or not the watcher 50 watches the display 30 as a result compared to those calculated angles and distance. Thus, if meeting conditions C11 and C12 in step 15, the main processor 11 determines the person 50 as watching the display 30 in step S16. On the other hand, the main processor 11 determines the person 50 is not watching the display 30 in step 27 if not meeting at least one of the conditions C11 and C12.

Figure 10A:
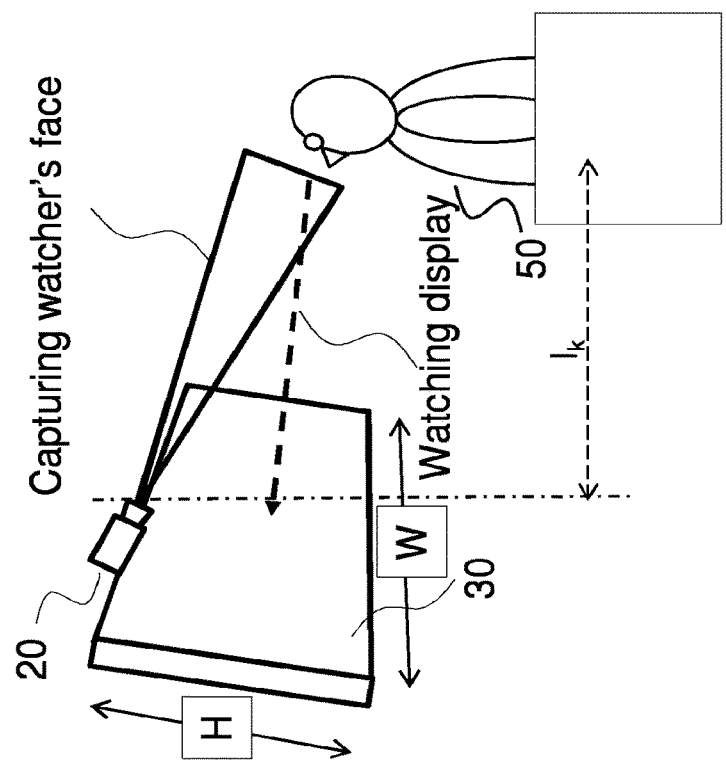
FIG. 10A is an illustration of a system in accordance with a feature of the disclosure.
Figure 10B:
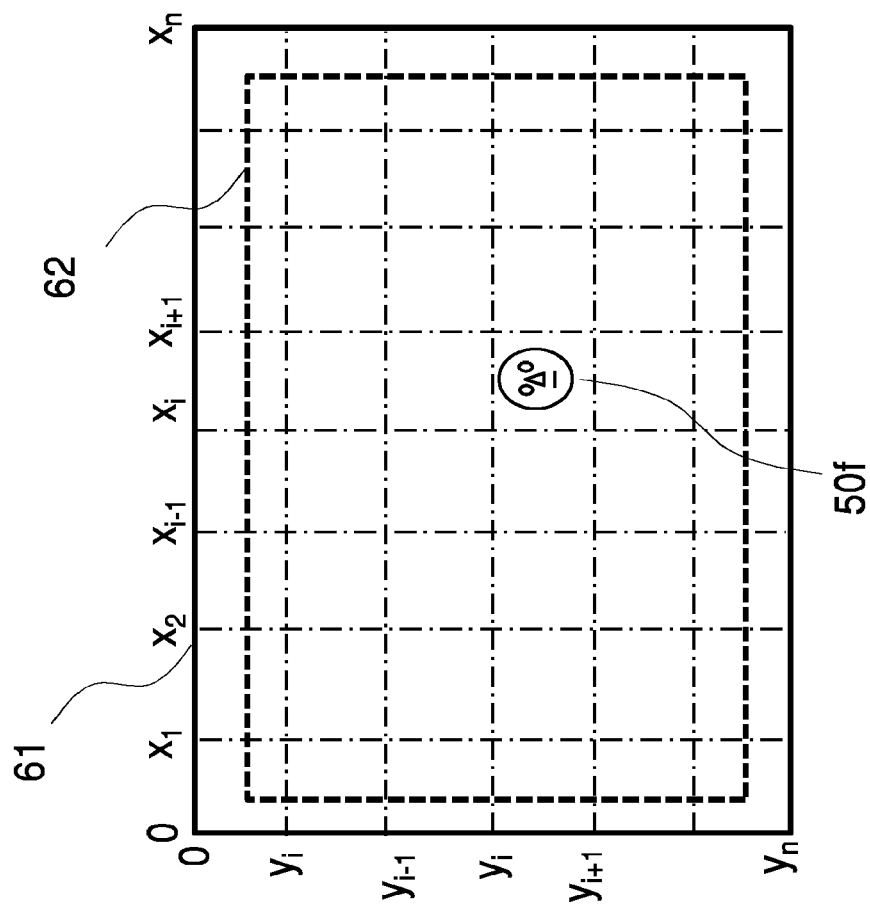
FIG. 10B is an example of a captured image in accordance with a feature of the disclosure.

FIG. 10A is an illustration of a method in accordance with a non-limiting feature of the disclosure. The processor 11 detects the watcher 50 watching the display 30 if meeting a condition of $\alpha_{now\_X(i)\_Y(i)\_Ik} \leq C1 * \alpha_{base\_X(i)\_Y(i)\_Ik}$ and $\beta_{now\_X(i)\_Y(i)\_Ik} \leq C1 * \beta_{base\_X(i)\_Y(i)\_Ik}$. A height of the display 30 (in FIG. 10A) is defined as H, a width of the display 30 (in FIG. 10A) is defined as W. FIG. 10B shows an image 61 indicating X and Y coordinates and captured by the camera 20. A face 50f of the person 50 in the captured image 61 is positioned between $x_i$ and $x_{i+1}$ and between $y_i + y_{i+1}$. As long as the face 50f within an area 62, the controlling system 10 detects the face 50 for calculating the lines of sight. Accordingly, $\alpha_{now\_X(i)\_Y(i)\_Ik}$, $\alpha_{base\_X(i)\_Y(i)\_Ik}$, $\beta_{now\_X(i)\_Y(i)\_Ik}$ and $\beta_{base\_X(i)\_Y(i)\_Ik}$ are changed based on a face position detected in the image. C1 is calculated in accordance with height H and predetermined constant R. C2 is calculated in accordance with width W and predetermined constant R.

Each of specific definitions is described as below:

$I_k$: horizontal distance from camera to watcher $\alpha_{base\_xi,yj\_Ik}$: vertical face angle with camera when watching the center of signage from distance of $I_k$ (predefined)

$\beta_{base\_xi,yj\_Ik}$: horizontal face angle with camera when watching the center of signage from distance of $I_k$ (predefined)

$\alpha_{now\_xi,yj\_Ik}$: current vertical face angle with camera when looking at signage from distance of $I_k$ $\alpha_{now\_xi,yj\_Ik}$: current horizontal face angle with camera when looking at signage from distance of $I_k$ $C_1$, $C_2$: a constants defined respectively based on the e height and width of signage(predefined)

A detected face of the person 50 located between $x_i$ and $x_{i+1}$ and also between $y_i$ and $y_{i+1}$ is detected as a watcher if meeting below conditions:

$$\alpha_{now\_xi,yj\_Ik} \leq C1 * \alpha_{base\_xi,yj\_Ik}$$

$$\beta_{now\_xi,yj\_Ik} \leq C2 * \beta_{base\_xi,yj\_Ik}$$

$$C_1 = R*H$$

$$C_2 = R*W$$

R: a predefined constant

Figure 11:
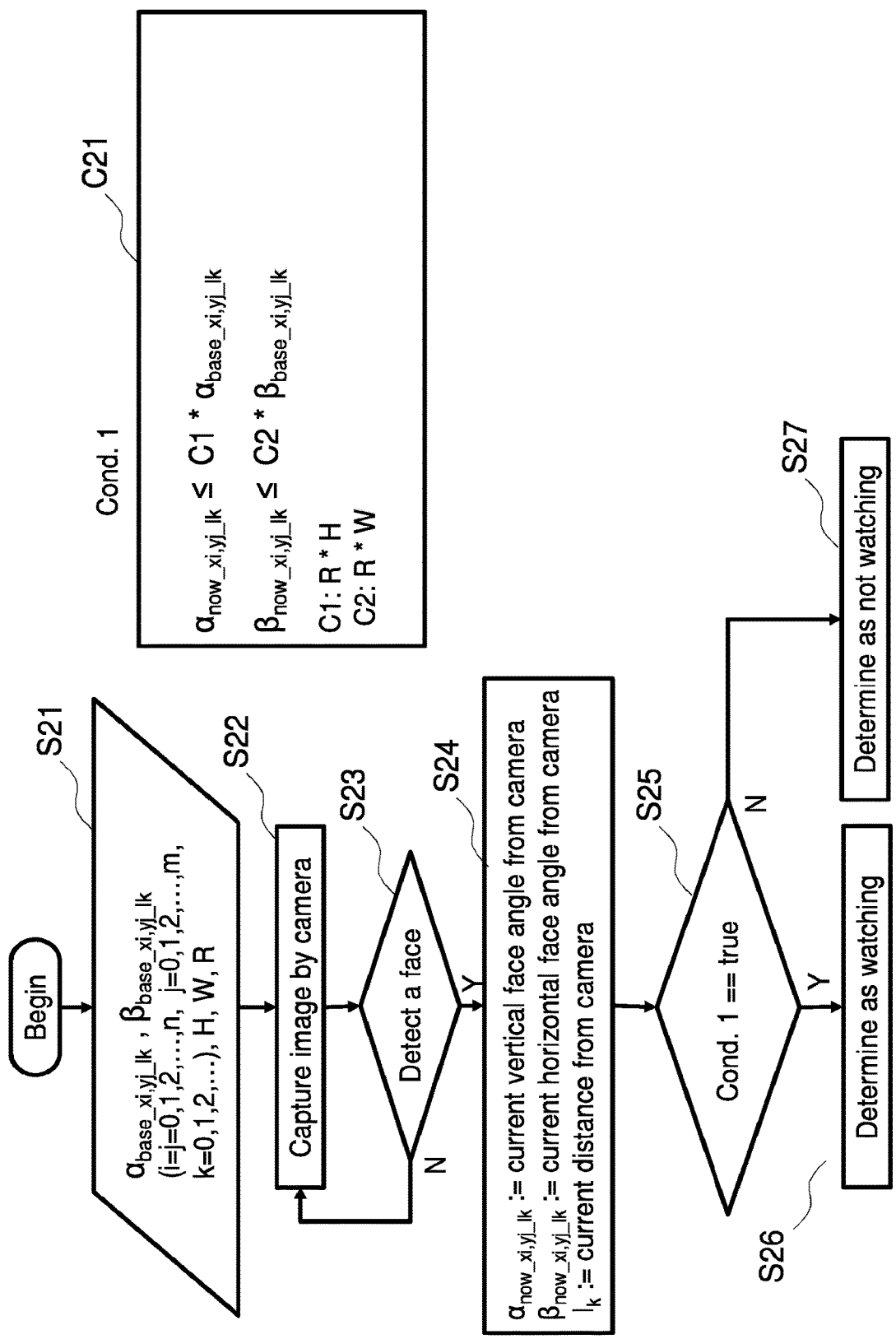
FIG. 11 is a flowchart in accordance with a feature of the disclosure.

FIG. 11 is a flowchart in accordance with a non-limiting feature of the disclosure. The processer 11 detects the watchers 50 according to the flowchart shown in FIG. 11 with the system shown in FIG. 10A.

In step S21, the main processor 11 or the camera 20 calculate angles $\alpha_{base\_xi,yj\_Ik}$ and $\beta_{base\_xi,yj\_Ik}$ based on the position information 13p in advance. In step 22, the camera 20 captures an image. Then if the camera 20 detects a face in an image captured by the camera 20 in step S23, the main processor 11 calculates angles $\alpha_{now}$, $\beta_{now}$ and the distance $I_k$ in step 24. Then, in step 25 the main processor 11 determines whether or not the watcher 50 watches the display 30 as a result compared to those calculated angles and distance. Thus, if meeting condition C21 in step 25, the main processor 11 determines the person 50 is watching the display 30 in step S26. On the other hand, the main processor 11 determines that the person 50 is not watching the display 30 in step 27 if not meeting at least the one condition C21.

Figure 12A:
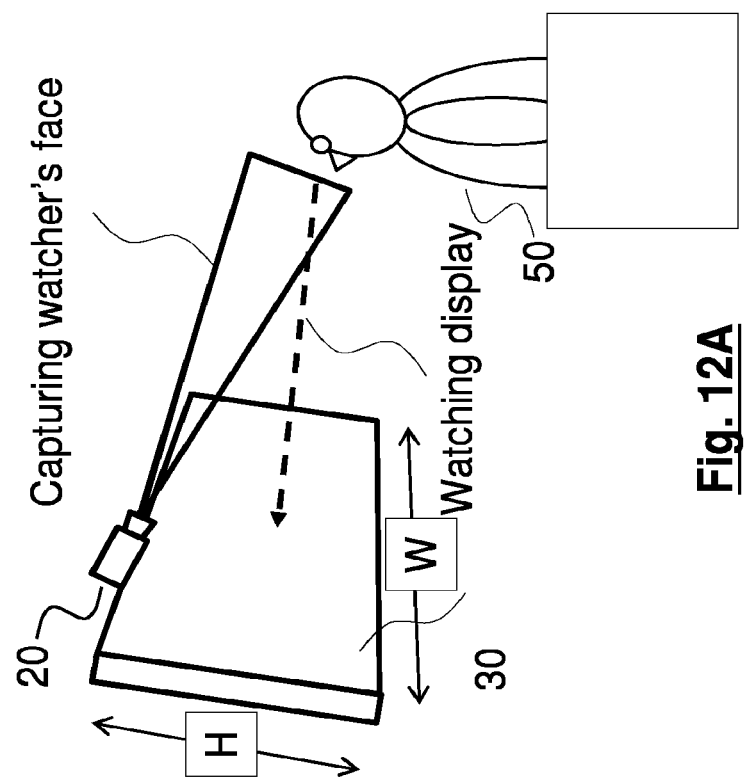
FIG. 12A is an illustration of system in accordance with a feature of the disclosure.
Figure 12B:
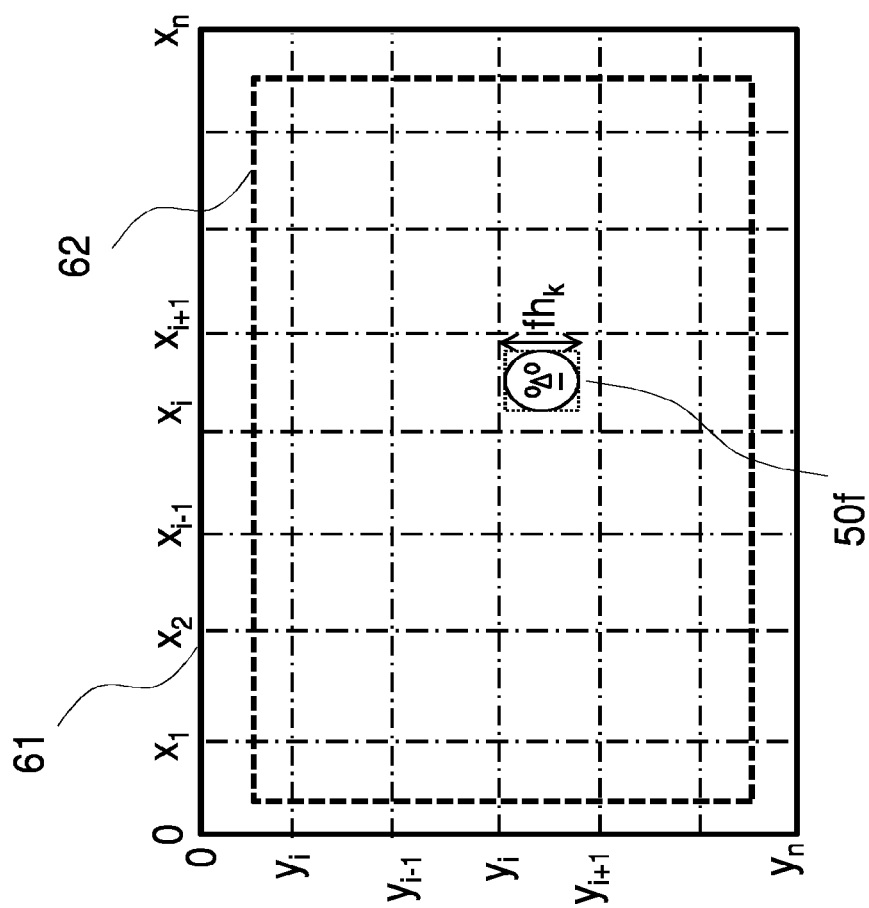
FIG. 12B is an illustration of a system in accordance with a feature of the disclosure.

FIGS. 12A and 12B show a further example similar to FIGS. 10A and 10B. However, the example of FIGS. 12A and 12B further use a height of the watcher's face $fh_k$ in order to determine $\alpha_{now\_X(i)\_Y(i)\_Ik}$, $\alpha_{base\_X(i)\_Y(i)\_Ik}$, $\beta_{now\_X(i)\_Y(i)\_Ik}$ and $\beta_{base\_X(i)\_Y(i)\_Ik}$. the person 50 is detected as a watcher if meeting below conditions:

$$\alpha_{now\_xi,yj\_rk} \leq C1 * \alpha_{base\_xi,yj\_rk}$$

$$\beta_{now\_xi,yj\_rk} \leq C2 * \beta_{base\_xi,yj\_rk}$$

$$C_1 = R*H$$

$$C_2 = R*W$$

R: a predefined constant $fh_k$: height of watcher's face as seen in the camera(height of the square drawn to cover watcher's face)

$\alpha_{base\_xi,yj\_rk}$: vertical face angle with camera when watching the center of signage at face size of $r_k$ (predefined)

$\beta_{base\_xi,yj\_rk}$: horizontal face angle with camera when watching the center of signage at face size of $r_k$ (predefined)

$\alpha_{now\_xi,yj\_rk}$: current vertical face angle with camera when of signage at face size of $r_k$ $\alpha_{now\_xi,yj\_rk}$: current horizontal face angle with camera when of signage at face size of $r_k$ C1, C2: a constants defined respectively based on the height and width of signage(predefined)

Figure 13:
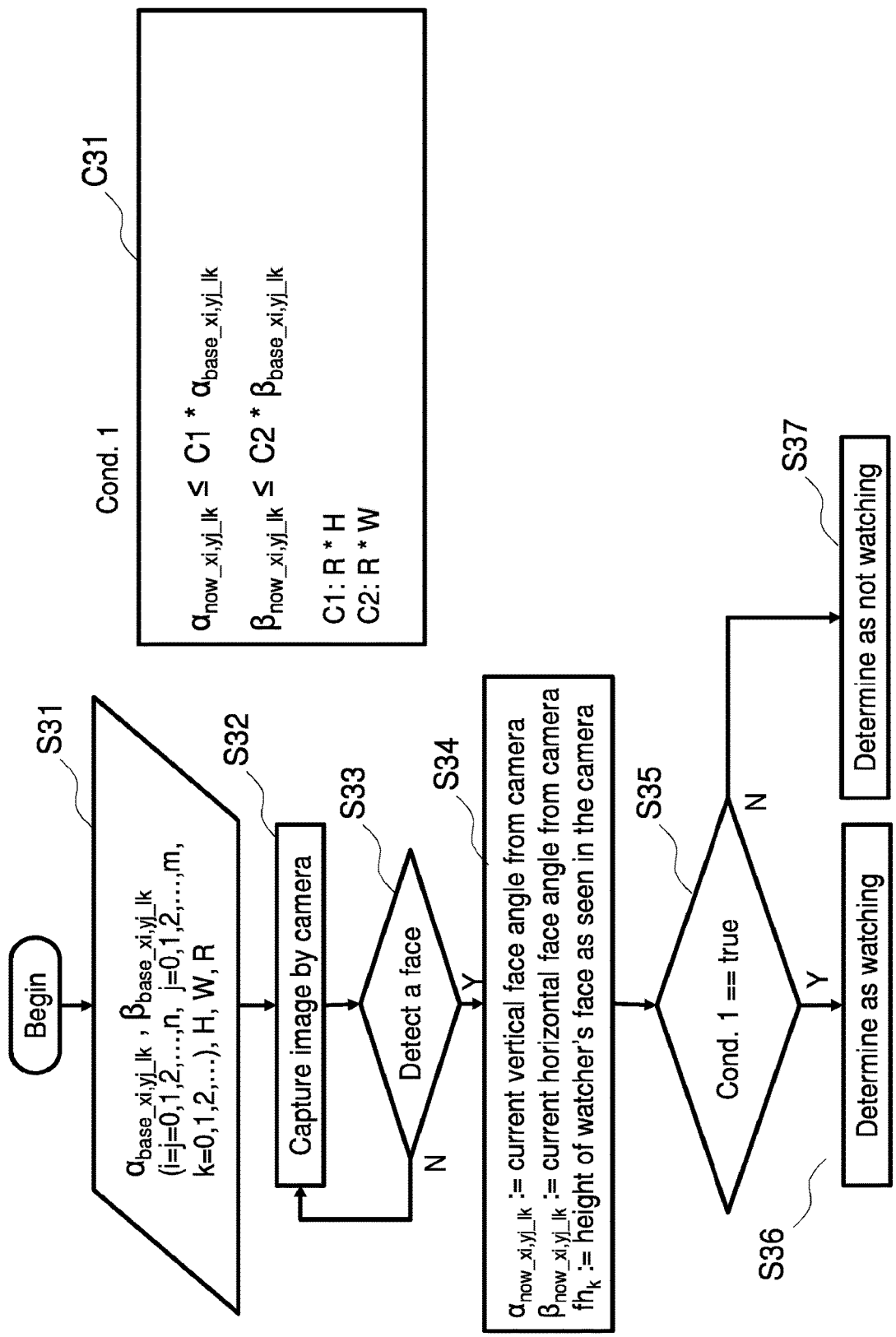
FIG. 13 is a flowchart in accordance with a feature of the disclosure.

FIG. 13 is a flowchart in accordance with a non-limiting feature of the disclosure. The main processer 11 detects the watchers according to the flowchart shown in FIG. 13 with the system 100 shown in FIG. 12A.

In step S31, the main processor 11 or the camera 20 calculate angles $\alpha_{base\_xi,yj\_Ik}$ and $\beta_{base\_xi,yj\_Ik}$ based on the position information 13p in advance. In step 32, the camera 20 captures an image. Then if the camera 20 detects a face in an image captured by the camera 20 in step S33, the main processor 11 calculates angles $\alpha_{now}$, $\beta_{now}$ and the distance $I_k$ in step 34. Then, in step 25 the main processor 11 determines whether the watcher 50 watches the display 30 or not as a result compared to those calculated angles and distance. Thus, if meeting condition C31 in step 35, the main processor 11 determines that the person 50 is watching the display 30 in step S36. On the other hand, the main processor 11 determines that the person 50 is not watching the display 30 in step 37 if not meeting at least the condition C31.

Figure 14A:
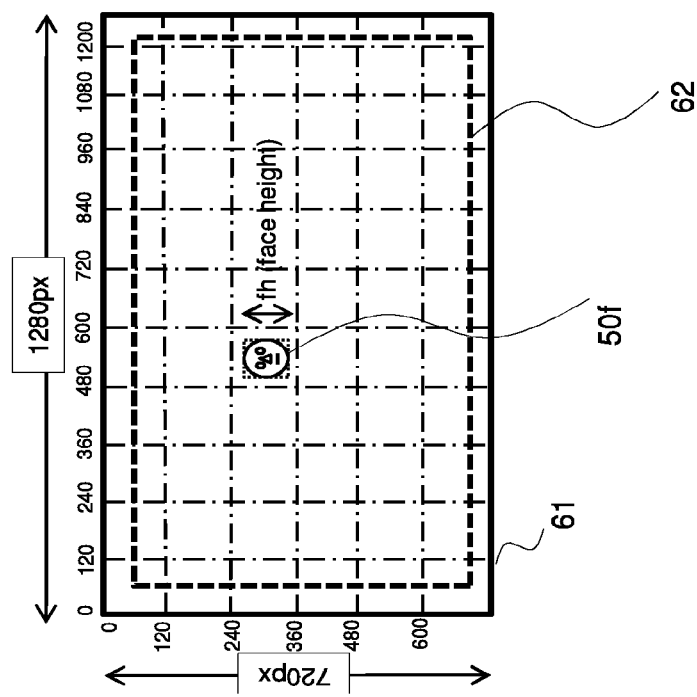
FIG. 14A is an examples of a captured image in accordance with a feature of the disclosure.

FIG. 14A is an examples of a captured image in accordance with a non-limiting feature of the disclosure. FIG. 14B shows examples of predetermined (reference) data in accordance with a non-limiting feature of the disclosure.

Figure 15A:
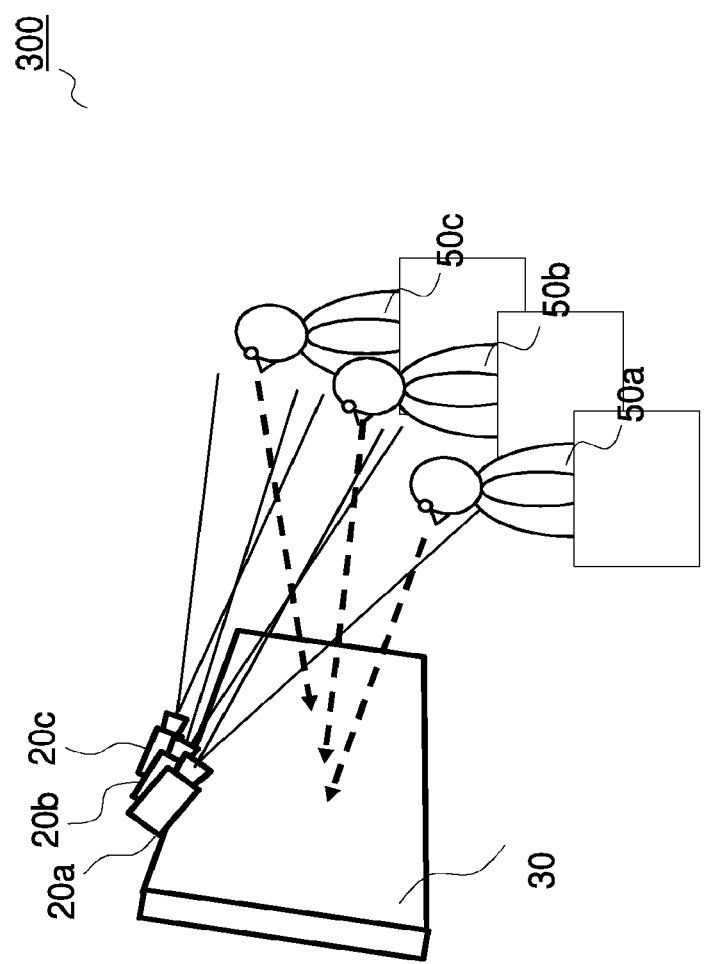
FIG. 15A is an illustration of a system in accordance with a feature of the disclosure.
Figure 15C:
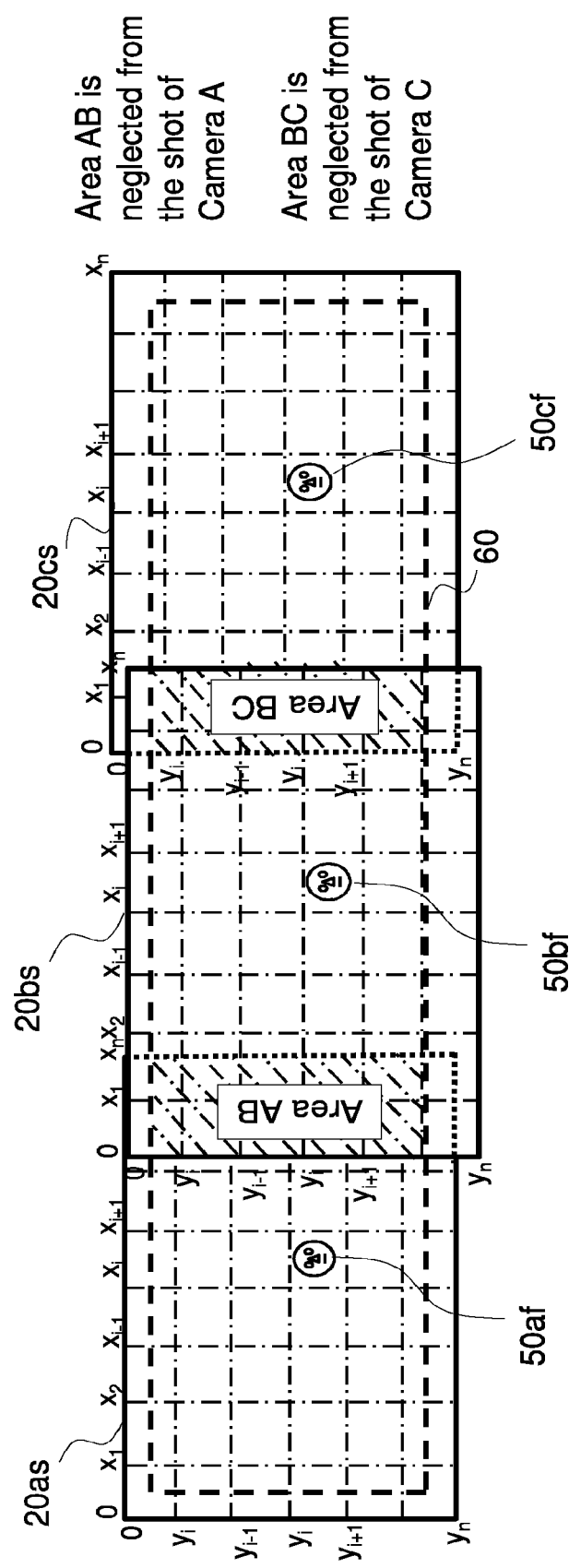
FIG. 15C is an example of captured images in accordance with a feature of the disclosure.

FIG. 15A is an illustration of a system 300 in accordance with a non-limiting feature of the disclosure. FIG. 15B is a top view of the system 300 in accordance with a non-limiting feature of the disclosure. The system 300 includes three cameras 20a-20c which include the same functions and configurations as the camera 20 described above and are connected to the controlling system 10 via the network. In this example, each of cameras 20a-20c picture each of the persons 50a-50c. Herein a captured image 20 as taken by the camera 20a, a captured image 20bs taken by the camera 20b and a captured image 20ac taken by the camera 20c are shown in shown in FIG. 15C. An area AB is an overlapped area between the shot images 20as and 20bs. An area BC is an overlapped area between the shot images 20bs and 20cs. The main processor 11 of the controlling system 10 may generate a merged area 60 and display it on the computer 40 or another device. As long as a watcher's face 50af-50cf is within the merged area 60, the controlling system 10 detects faces of watchers 50a-50c for calculating their lines of sight.

Figure 16:
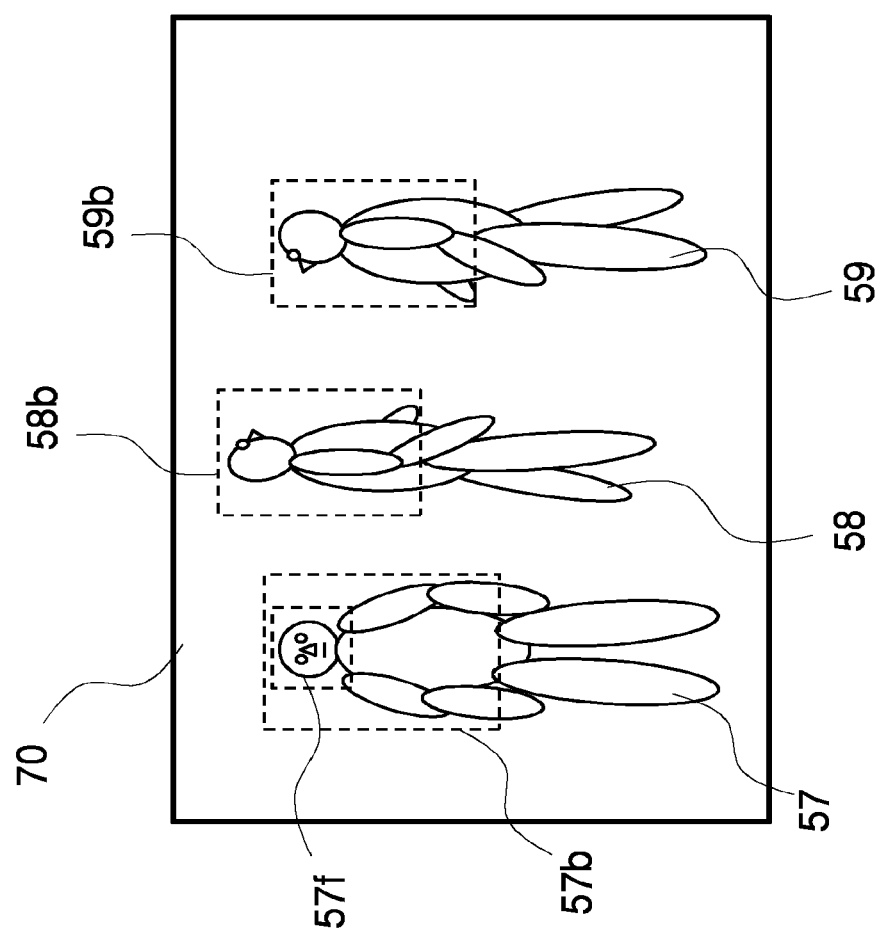
FIG. 16 is an example of a captured image in accordance with a feature of the disclosure.

FIG. 16 is an example of a captured image 70 in accordance with a non-limiting feature of the disclosure. The captured image 70 shows three humans 57-59, but only a left human 57 of three is recognized or detected as a face and a body by the image processing as a function of the image processor 12 because the left human 57 faces the camera or the display. On the other hands, a center human 58 and a right human 59 are not detected as faces but detected as bodies because the center and right humans 58 and 59 face another direction. Accordingly, the camera 20 or the processer 11 can count almost all people captured by the camera 20 even if parts of the people do not look at the display 30. The camera 20 or the processer 11 can further detect humans, among all people detected as bodies, which face the camera 20 or the display 30. Then the camera 20 or the processer 11 can further detect some specific humans as the watcher through the use of the above mentioned image processing technologies by using some calculated angles. In addition, for showing that the controlling system 10 recognizes a face or a body, a face area 57f and body areas 57b-59b are also displayed on the captured image 70. The face area 57f is positioned within the body area 57b.

(2) Application

Figure 17:
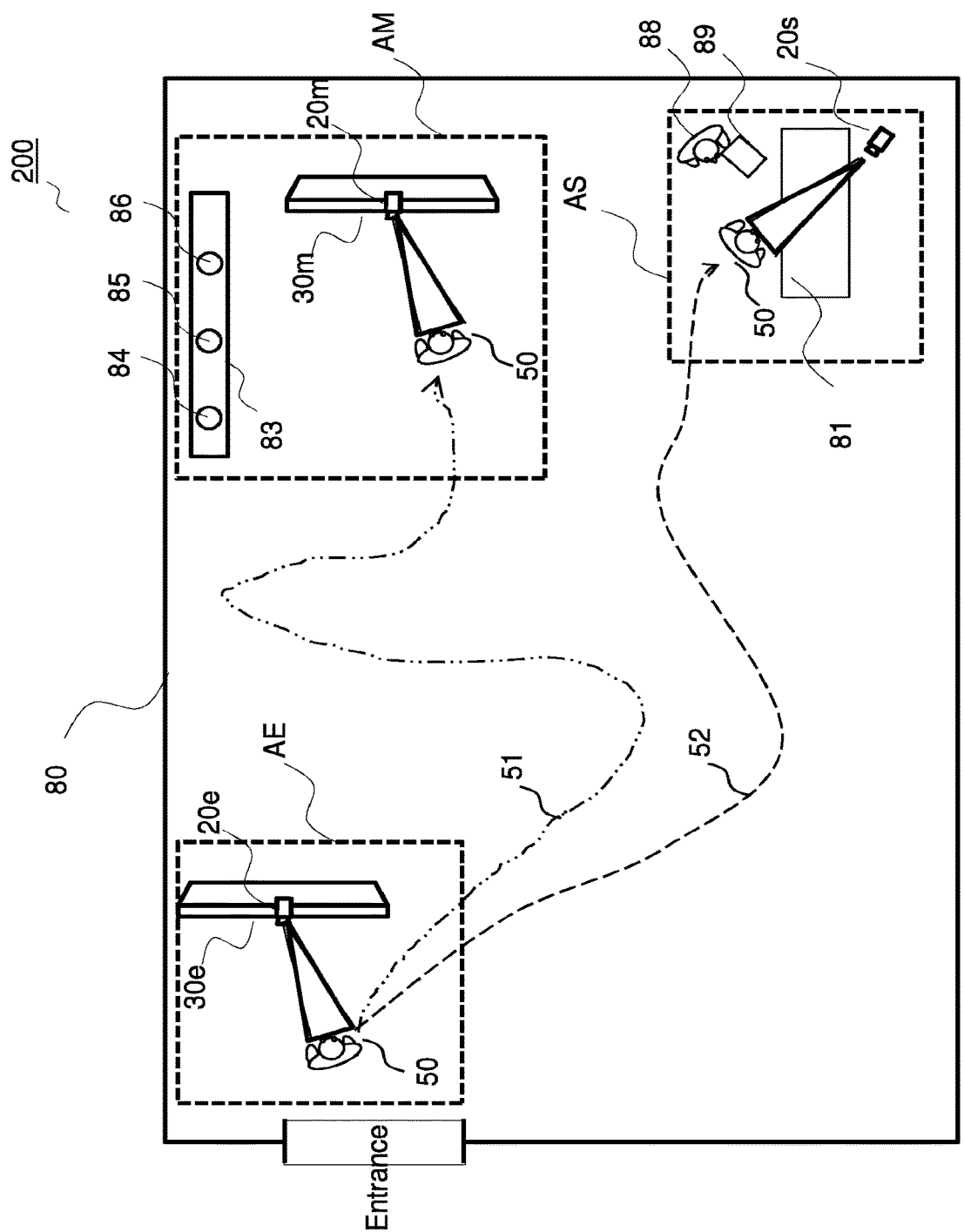
FIG. 17 is an illustration of system in a retail store in accordance with a feature of the disclosure.

FIG. 17 is an illustration in accordance with a feature of the disclosure. FIG. 17 shows an application, as an example, that uses a result of a detected watcher. In this example, a system 200 for promoting merchandises in accordance with interests of customers is explained herein. The system 200 includes the controlling system 10 as described above, but not show in FIG. 17. The controlling system 10 of the system 200 is connected to a plurality of cameras 20e, 20m, 20s and a plurality of displays 20e and 20m via a network (e.g. a wired network, a wireless network or a combination thereof). The controlling system 10 may further be connected to merchandises 81 and a store terminal device 89 via the network.

For instance, if a customer 50 goes into a retail store 80 through an entrance, the camera 20e images the customer 50 in an area AE and the controlling system 10 determines whether or not the customer 50 watches one of the contents 13c displayed on the display 30e by using one of the features described above. If the customer 50 is detected as a watcher being interested in the content on the display 30e located in the area AE capturing watching people on a retail floor of a retail store 80, an image of a face of the customer 50 is stored in the memory 13.

In addition, if the camera 20m in an area AM captures an image of the customer 50 who has walked along a moving line 51, the controlling system 10 compares a face image of the customer 50 in the area AM with a plurality of face images stored in the memory 13 and taken in the area AE. Then the main processor 11 of the controlling system 10 try to find a face image, which corresponds to a face of the customer 50 detected in the area AM, among from the face images stored in the memory 13. If detecting the face image, the main processor 11 outputs merchandise information, stored in the memory 13, corresponding to the content that the display 20e displayed and the customer was interested in. The memory 13 stores a plurality of merchandise data which may include, for example, a price and/or a specification of a certain product. Accordingly, the main processor 11 selects at least one of the merchandise information in accordance with face detection results of the camera 20e and 20m to display the selected one on the display 20m. In addition, the system 200 may include an input device (e.g. a touch panel attached on the display 30m, physical buttons on the display 30m or another device different from the display 30m) for purchasing at least one of merchandises displayed on the display 30m. Hence, the customer 50 could make a payment for the merchandises by using the input device on the moment. Thereby the system 200 facilitates the customer 50 finding and easily obtaining what he/she wants. If the purchased merchandise is an object that is not placed around the display 30m, the system 200 may have a printer, near the display 20m, for outputting a claim receipt when the payment is finished. Then the customer 50 could pick up the object at a pick-up location with the claim receipt. In addition, a shelf 83 on which has indicators (e.g. lights) 84-86 may be placed in the area AM. A plurality kinds of products are on the shelf 83. If the controlling system 10 detects the face of the customer 50 in the area AM, the main processor 11 may turn on at least one of the indicators 84-86 which corresponds to (i.e. be close to) a location of a product with associated with the content that the customer watched in the area AE.

As a similar example, if the camera 20s in an area AS captures an image of the customer 50 who has walked along a moving line 52, the controlling system 10 compares a face image of the customer 50 in the area AS with a plurality of face images stored in the memory 13 and captured in the area AE. If the main processor 11 finds the same face among from the plurality of face images as being similar to the customer 50 walking along the walking line 51 as described above, the merchandise 81, in associated with the content that the customer watched in the area AE, shows up in the area AS. For example, the merchandise 81 is carried to the area AS by a staff of the retail store 80 or a machine.

Furthermore, the main processor 11 of the controlling system 10 may transmit information about the customer 50 to the store terminal device 89 via the network which is operated by a store staff 88. As an example, FIG. 18 shows an example of the store terminal device 89. The store terminal device may be a mobile device and include a touch panel display 91 as an input and physical buttons 92a-92c as another input. The touch panel display 91 shows a search condition box 93 and a results box 94. The store staff 88 makes conditions for searching desired customers by picking up each condition in the search condition box 93. After making the conditions, results in the box 94 are updated. As a first condition, one or more places where customers watched any display are picked up. In this case, the area AE and the area AS are selected since the store staff 88 is in charge of the area AS. Thus, results in the box 94 lists customers who watched both the display 30e in the area AE and the display 30s in the area AS. As a second condition, one or more time when customers watched any display are picked up. In this case, "within 30 minutes" is selected. Thus, results in the box 94 list customers who watched either the display 30e in the area AE or the display 30s in the area AS within 30 minute from present time. As a third condition, one or more contents (interests) that customers watched are picked up. In this case, "all" is selected. Thus, results in the box 94 list customers who were interested in any of the contents. A fourth condition is gender. A fifth condition is age.

Therefore, the system 200 facilitates directing customers to find and easily obtain what they want by sharing their interests with different places.

Figure 19:
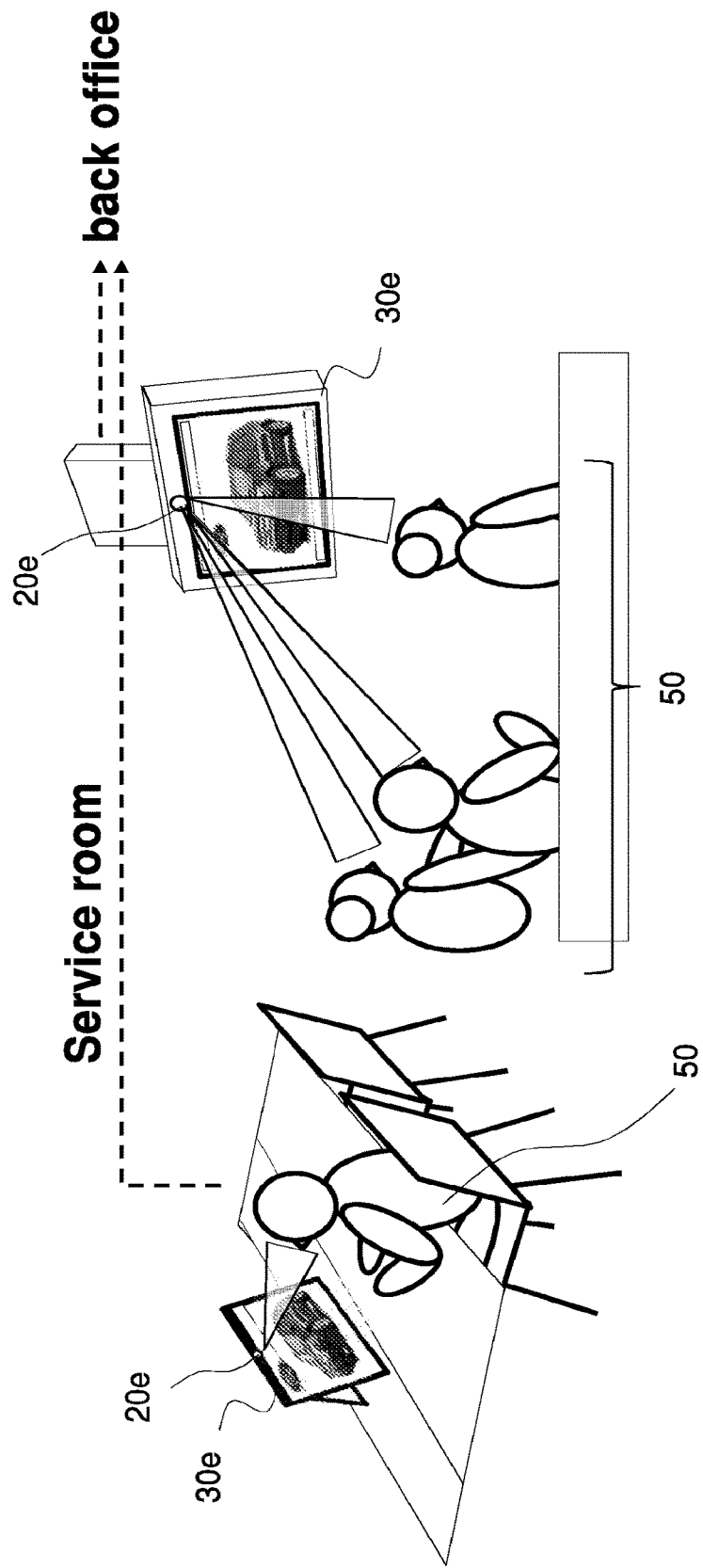
FIG. 19 is an illustration of system in a car shop in accordance with a feature of the disclosure.

FIG. 19 an illustration of system in a car shop in accordance with a feature of the disclosure. FIG. 19 shows another example of the system 200. The camera 20e is embedded in the display 30e to monitor interests of customers 50 waiting for a car sales man and located in a service room. Data with respect to the interests of the obtained by the camera 30e and the display 20e is transferred to the controlling system 10 and can be seen by the computer 40 located in an office room.

(3) Visualization

Figure 20:
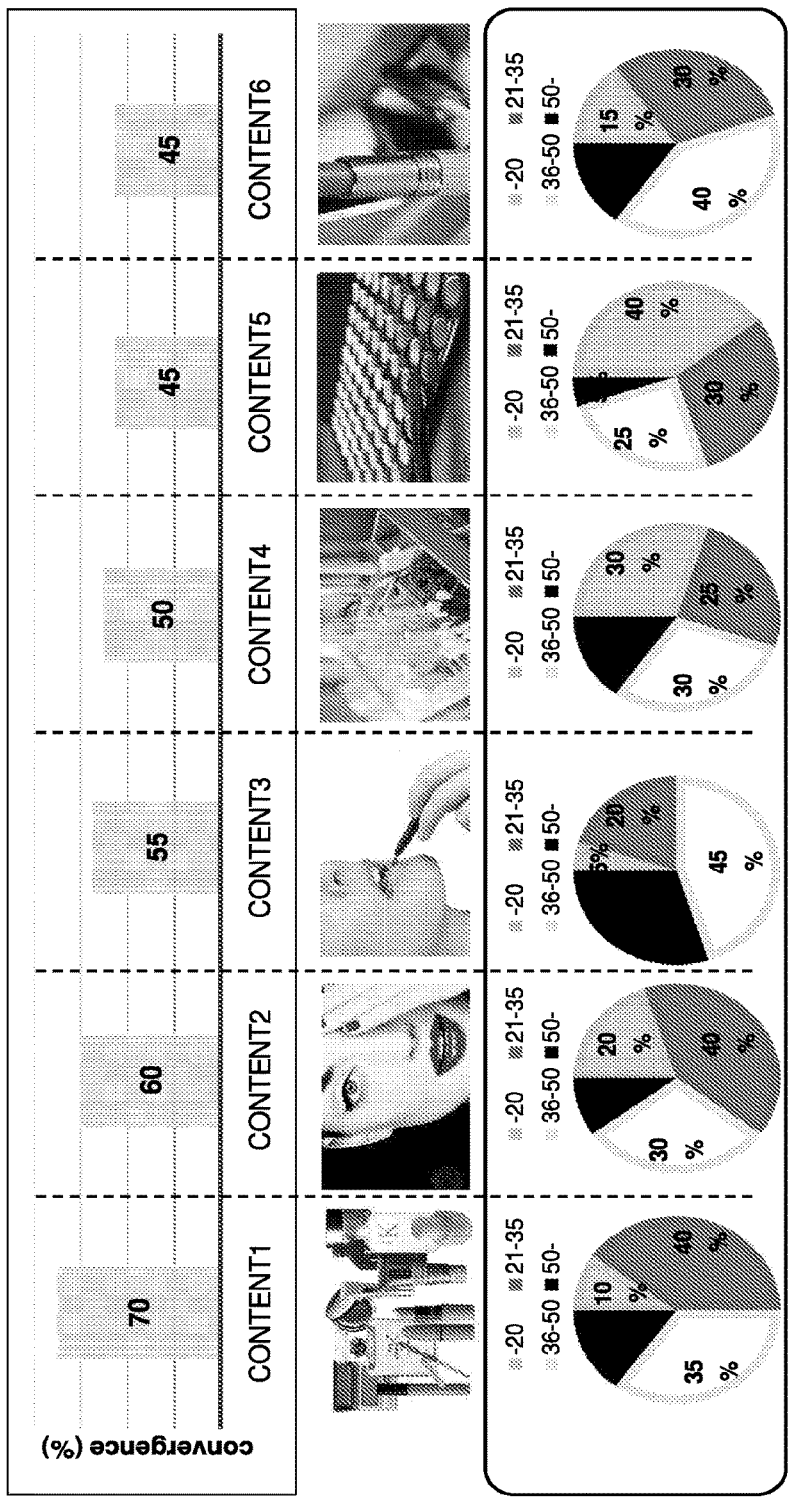
FIG. 20 is an example of a statistical overview in accordance with a feature of the disclosure.
Figure 21:
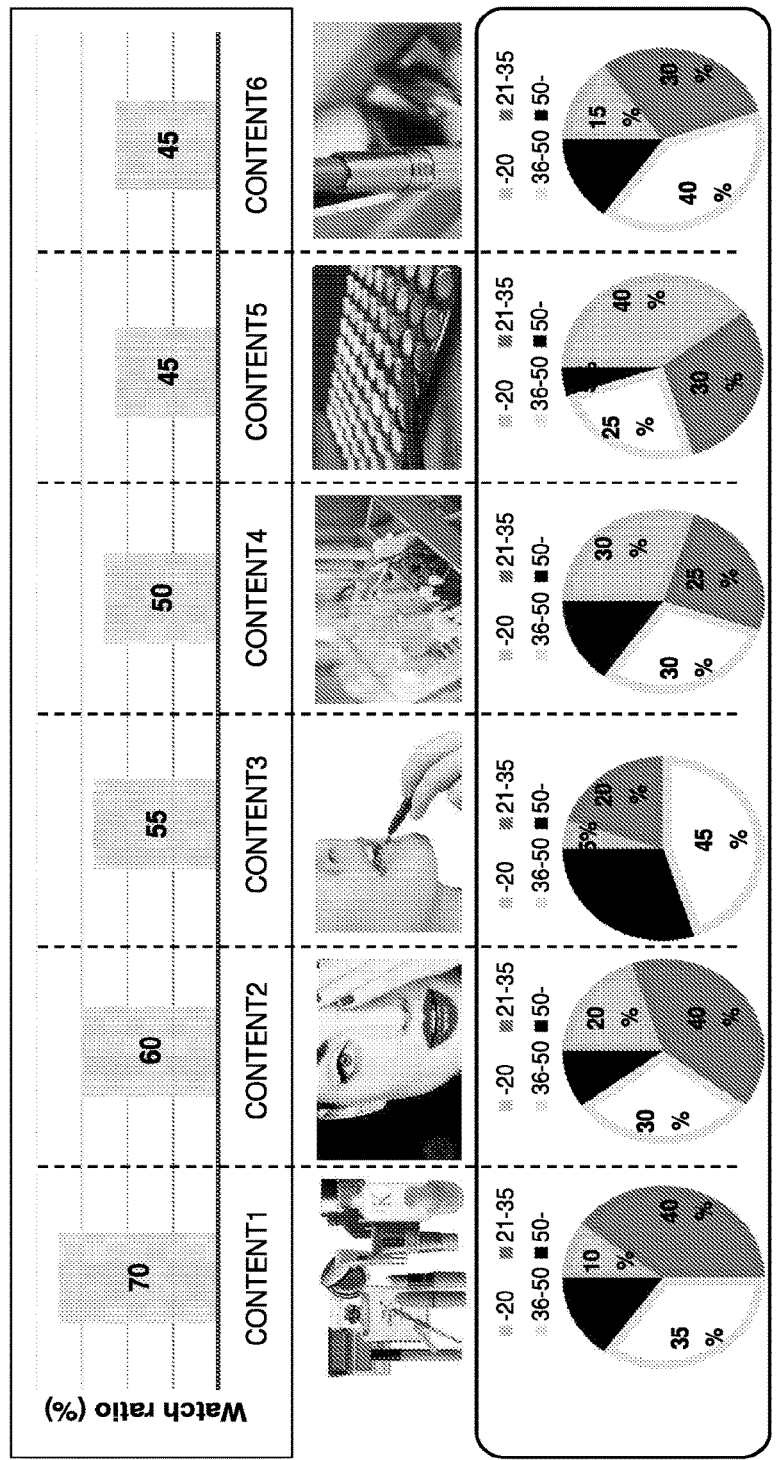
FIG. 21 is an example of a statistical overview in accordance with a feature of the disclosure.

FIG. 20 is an example of a displayed image in accordance with a non-limiting feature of the disclosure. FIG. 21 is an example of a displayed image in accordance with a feature of the disclosure. Those images may be displayed on the computer 40 or the store terminal device 89. Those displayed images show an analyzed result, corresponding to an example of the statistical data 13d, including a plurality of results according to the image processing mentioned above. For instance, a percentage of the convergence or watch rate is displayed corresponding to each contents (e.g. cosmetics) displayed on displays. Further the main processer 11 may have a function assuming an age of detected faces. Herewith age groups, each of which corresponding to contents, are also displayed as the analyzed result.

Figure 22:
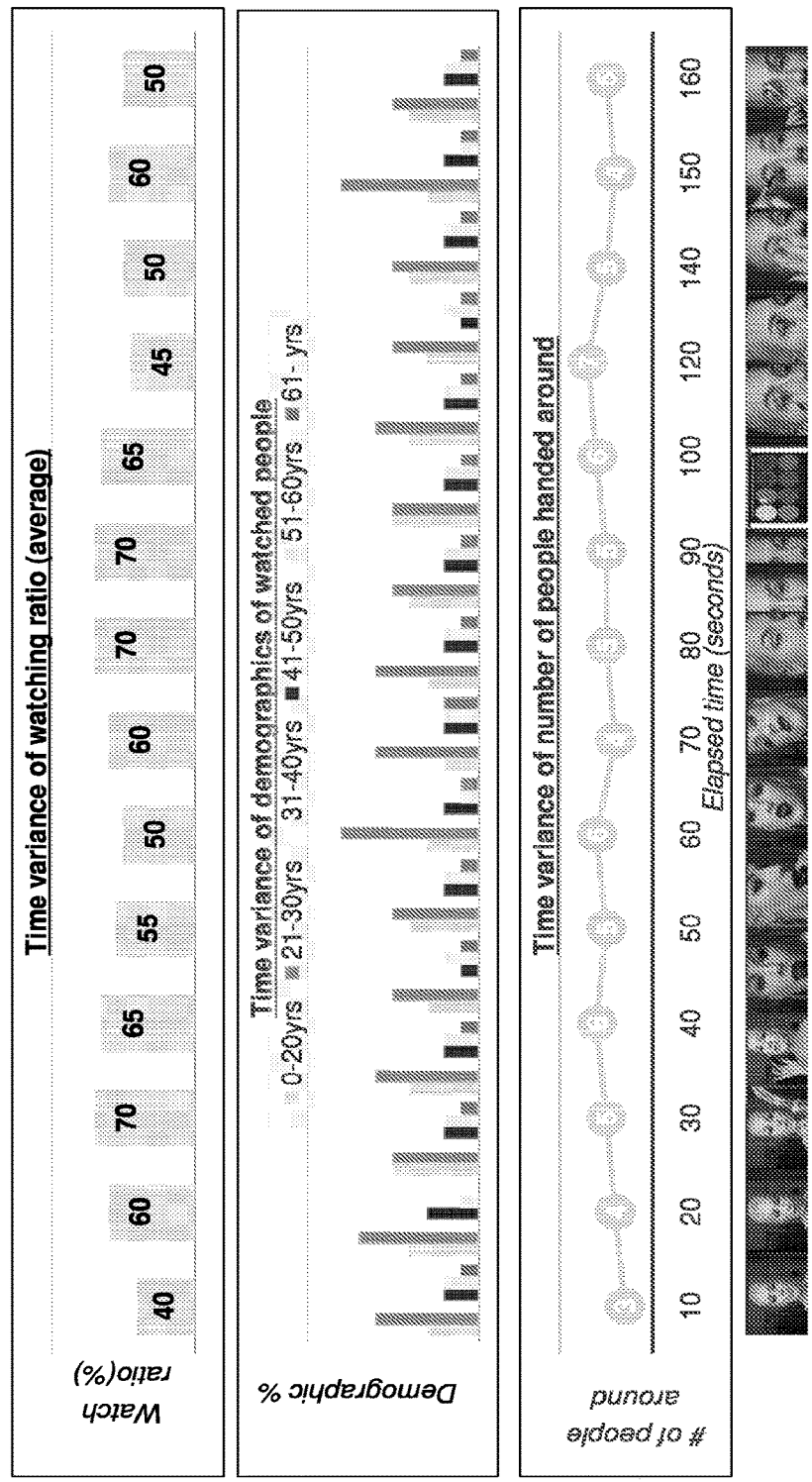
FIG. 22 is an example of a data visualization in accordance with a feature of the disclosure.

FIG. 22 is an example of a displayed image in accordance with a non-limiting feature of the disclosure. FIG. 22 shows temporal transitional results during 160 seconds. The results, corresponding to an example of the statistical data 13d, include the watch rate and demographics corresponding to each period (e.g., 10 seconds).

Figure 23:
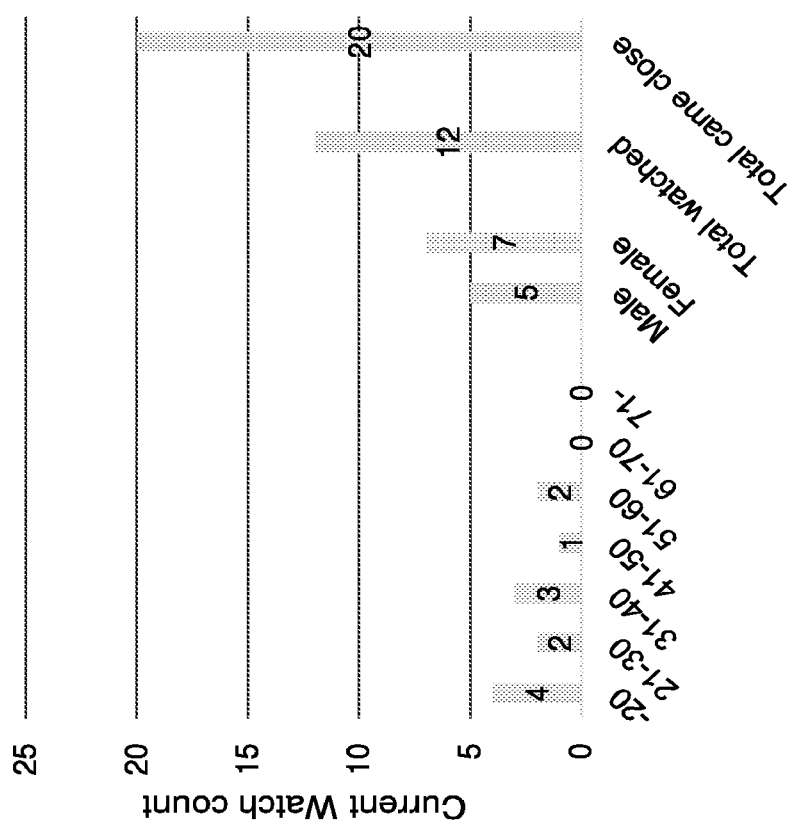
FIG. 23 is an example of a statistical overview in accordance with a feature of the disclosure.

FIG. 23 is an example of a displayed image in accordance with a non-limiting feature of the disclosure. FIG. 23 shows another analyzed result in a predetermined period. According to this analyzed result, corresponding to an example of the statistical data 13d, in FIG. 23, twenty total people had walked near the display as signage or had their body detected by the system 100 or 200. Further, twelve of the twenty people were detected as a watcher looking at the signage, five of the twelve were detected as male, and seven of the twelve were detected as female.

Figure 24:
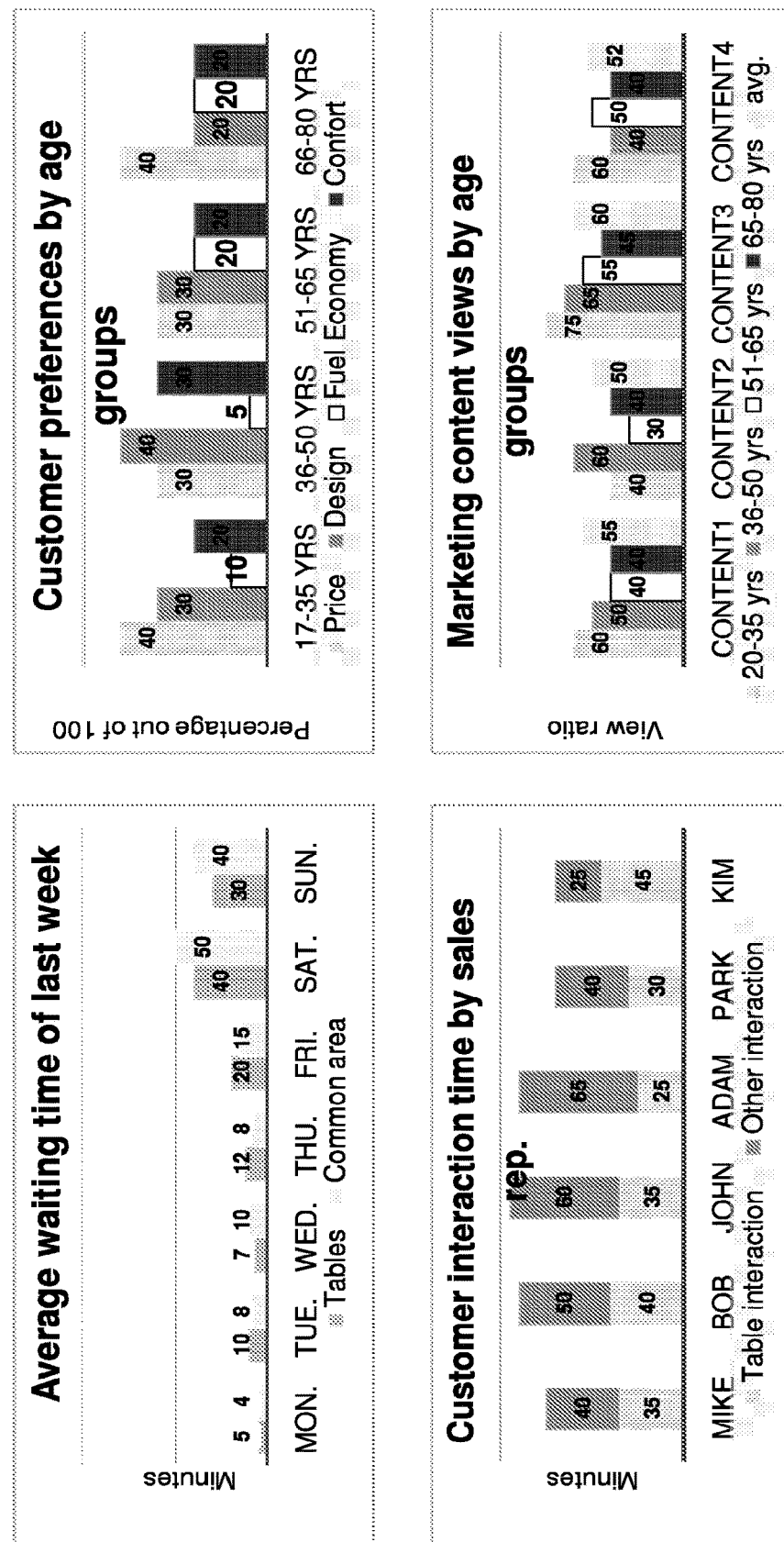
FIG. 24 is an example of a statistical overview in accordance with a feature of the disclosure.

FIG. 24 is an example of a statistical overview in accordance with a feature of the disclosure. FIG. 24 shows average waiting time of customers in the service room show in FIG. 19.

FIG. 25 is an example of data source for making statistical data in accordance with a non-limiting feature of the disclosure. FIG. 25 shows a portion of original data for making examples of the statistical data 13d shown in FIG. 20-24. The data in FIG. 25 indicates, for example, (1) person No. 1 had watched a video A displayed, as a content, on a display placed in an area AE for 5 seconds between 11:09:45 AM and 11:09:50 AM on Sep. 21, 2016, (2) the 5 seconds corresponds to play time of the video A between 0:00:02 and 0:00:07 during which the video A introduces lipstick, (3) person No. 1's face was detected for 11 seconds between 11:09:42 AM and 11:09:53 AM and (4) person No. 1 is determined as 22 years old and a female based on the image processing on the detected face. The data in FIG. 25 further indicates that person No. 2's body was detected, but his/her face was not detected. The data in FIG. 25 further indicates that (1) person No. 3's body was detected, (2) person No. 3 was determined as not watching contents on displays and (3) person No. 3 is determined as 43 years old and a male based on the image processing on his detected face. The data in FIG. 25 further indicates that (1) person No. 4 and person No. 5 might be the same person since her faces and durations during which her faces had been detected are the same. A person whose body is only detected, such as person No. 2, may be counted as one of a total number when the statistical data, such as examples shown in FIG. 20-24, is generated.

Figure 26:
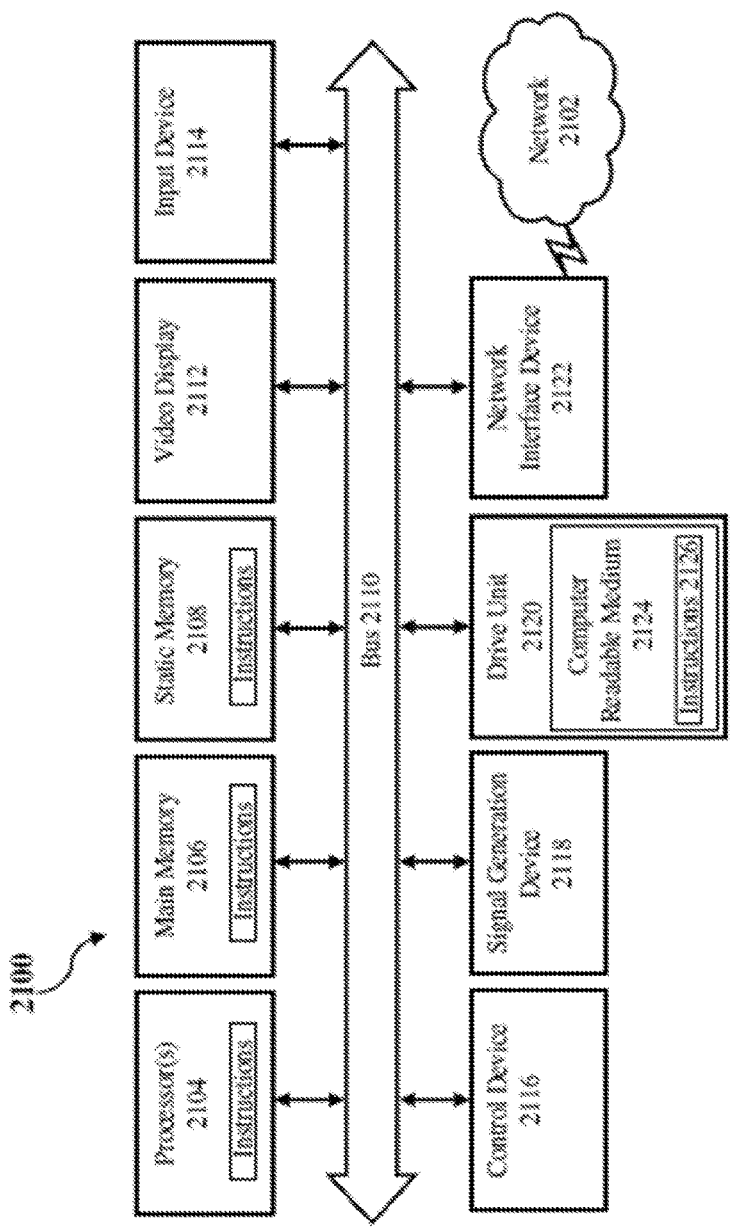
FIG. 26 is a schematic of a system, according to an aspect of the present disclosure.

FIG. 26 is an exemplary embodiment of the systems, apparatuses, and devices described herein. Any of the systems, apparatuses, and devices may include any combinations of the features shown in FIG. 26, as well as any additional or alternative features as generally understood in the art. For example an exemplary embodiment of a system is generally shown at 2100 in FIG. 26. The exemplary system 2100 of FIG. 26 is hereinafter referred to as computer system 2100 for convenience. The computer system 2100 may include a set of instructions that can be executed to cause the computer system 2100 to perform any one or more of the methods or computer based functions disclosed herein. The computer system 2100 may operate as a standalone device or may be connected, for example, using a network 2102, to other computer systems or peripheral devices, such as the camera of FIG. 1.

In a networked deployment, the computer system 2100 may operate in the capacity of a server or as a client user computer in a server-client user network environment, a client user computer in cloud computing environment, or as a peer computer system in a peer-to-peer (or distributed) network environment. The computer system 2100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communications device, a control system, a camera, a web appliance, a network router, switch or bridge, or any other machine capable of executing a set of instructions (sequential or otherwise) that specify actions to be taken by that machine. For example, the computer system 2100 may be implemented as, or incorporated into, an automobile or a wearable device, such as, but not limited to, watches, glasses, bracelets, and headsets. The computer system 2100 can be incorporated as or in a particular device that in turn is in an integrated system that includes additional devices. In a particular embodiment, the computer system 2100 can be implemented using electronic devices that provide voice, video or data communication. Further, while a single computer system 2100 is illustrated, the term "system" shall also be taken throughout the present disclosure to include any collection of systems or sub-systems that individually or jointly execute a set, or multiple sets, of instructions to perform one or more computer functions.

As illustrated in FIG. 21, the computer system 2100 includes a processor 2104. The processor 2104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 2104 is an article of manufacture and/or a machine component. The processor 2104 is configured to execute software instructions in order to perform functions as described in the various embodiments herein. The processor 2104 may be a general purpose processor or may be part of an application specific integrated circuit (ASIC). The processor 2104 may also be a microprocessor, a microcomputer, a processor chip, a controller, a microcontroller, a digital signal processor (DSP), a state machine, or a programmable logic device. The processor 2104 may also be a logical circuit, including a programmable gate array (PGA) such as a field programmable gate array (FPGA), or another type of circuit that includes discrete gate and/or transistor logic. The processor 2104 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 2100 includes at least one of a main memory 2106 and a static memory 2108. The main memory 2106 and the static memory 2108 can communicate with each other via a bus 2110. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 2100 may further include a video display device 2112, such as a liquid crystal display (LCD), an organic light emitting diode (OLED), a flat panel display, a solid state display, or a cathode ray tube (CRT). The video display device 2112 may be integrated with or physically separate from the components of the computer system 2100 described herein. For example, the video display device 2112 may comprise the display or signage.

Additionally, the computer system 2100 may include an input device 2114, such as a keyboard/virtual keyboard or touch-sensitive input screen or speech input with speech recognition. The computer system 2100 may also include a cursor control device 2116, such as a mouse or touch-sensitive input screen or pad, a microphone, etc. The computer system 2100 may also include a signal generation device 2118, such as a speaker or remote control, a disk drive unit 2120, and a network interface device 2122.

In a particular embodiment, as depicted in FIG. 26, the disk drive unit 2120 may include a computer-readable medium 2124 in which one or more sets of instructions 2126, e.g. software, can be embedded. Additionally or alternatively to the disk drive unit 2120, the computer system 2100 may comprise any additional storage unit, such as, but not limited to, a solid state storage or other persistent storage, which comprises the computer-readable medium 2124. Sets of instructions 2126 can be read from the computer-readable medium 2124. Further, the instructions 2126, when executed by a processor, can be used to perform one or more of the methods and processes as described herein. In a particular embodiment, the instructions 2126 may reside completely, or at least partially, within the main memory 2106, the static memory 2108, and/or within the processor 2104 during execution by the computer system 2100.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A system for detecting a person being interested in a target, the system comprising:
   a camera configured to capture an image of a location in front of a target area;
   a memory configured to store instructions and position information including an outline of the target area; and
   a processor that executes the instructions to perform operations including:
      receiving the image from the camera;
      detecting a face of a person within the image;
      detecting a face direction in accordance with the detected face;
      detecting a line of sight, corresponding to the detected face direction, of the person by performing image processing on the detected face;
      calculating an angle between the detected line of sight and a base line when viewed from a predetermined direction;
      calculating two reference angles based on the base line and an edge of the target area defined by the position information;
      determining whether the person looks at the target area in accordance with the detected face direction and the stored position information with respect to the target area; and
      determining that the person looks at the target area when the detected face direction is positioned within the outline position of the target area and the angle is within the two reference angles.

2. The system according to claim 1, wherein the position information includes a position of the target area and a position of the camera.

3. The system according to claim 2, wherein the operations further include:

calculating a relative position between the target area and the camera based on the position of the target area and the position of the camera, and determining whether the person looks at the target area further in accordance with the detected face direction and the relative position.

4. The system according to claim 2, wherein the operations further include:

calculating a condition for determining whether the person looks at the target area, the condition being determined based on a distance from the camera to the person.

5. The system according to claim 1, wherein the operations further include:

calculating time during which the person looks at the target area, and storing the calculated time in the memory.

6. The system according to claim 5, wherein the calculated time includes a start time, an end time, and a time period between the start time and end time.

7. The system according to claim 5, wherein the target area includes a display displaying a plurality of contents stored in the memory, and the memory further stores what is introduced by one of the plurality of contents during the calculated time.

8. The system according to claim 5, wherein the memory stores a table indicating persons detected by the camera, the persons including a first person of which a face is detected, and a second person of which a face is not detected.

9. A method for detecting a person being interested in a target, the method comprising:

receiving, by a processor, an image of a location in front of a target area, wherein the image is captured by a camera;

detecting, by the processor, a face of a person within the image;

detecting, by the processor, a face direction in accordance with the detected face;

detecting, by the processor, a line of sight, corresponding to the face direction, of the person by performing image processing on the detected face;

calculating, by the processor, an angle between the detected line of sight and a base line when viewed from a predetermined direction;

obtaining, from a memory, position information including an outline of the target area;

calculating, by the processor, two reference angles based on the base line and an edge of the target area defined by the position information;

determining, by the processor, whether the person looks at the target area in accordance with the detected face direction and the obtained position information with respect to the target area; and determining, by the processor, that the person looks at the target area when the detected face direction is positioned within the outline position of the target area and the angle is within the two reference angles.

10. The method according to claim 9, wherein the position information includes a position of the target area and a position of the camera.

11. The method according to claim 10, further comprising:

calculating, by the processor, a relative position between the target area and the camera based on the position of the target area and the position of the camera, and determining, by the processor, whether the person looks at the target area further in accordance with the detected face direction and the relative position.

12. The method according to claim 10, further comprising:

calculating, by the processor, a condition for determining whether the person looks at the target area, the condition being determined based on a distance from the camera to the person.

13. The method according to claim 9, further comprising:

calculating, by the processor, time during which the person looks at the target area, and storing, in the memory, the calculated time.

14. The method according to claim 13, wherein the calculated time includes a start time, an end time and a time period between the start time and end time.

15. The method according to claim 13, wherein the target area includes a display displaying a plurality of contents stored in the memory, and the method further comprises:

storing, in the memory, what is introduced by one of the plurality of contents during the calculated time.

16. The method according to claim 13, further comprising:

storing, in the memory, a table indicating persons detected by the camera, the persons including a first person of which a face is detected and, and a second person of which a face is not detected.

* * * * *